(12) United States Patent
Mori et al.

(10) Patent No.: US 11,964,894 B2
(45) Date of Patent: Apr. 23, 2024

(54) GLASS ROLL, GLASS ROLL MANUFACTURING METHOD, AND QUALITY EVALUATION METHOD

(71) Applicant: Nippon Electric Glass Co., Ltd., Shiga (JP)

(72) Inventors: Hiroki Mori, Shiga (JP); Koichi Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 232 days.

(21) Appl. No.: 16/770,165

(22) PCT Filed: Jan. 29, 2019

(86) PCT No.: PCT/JP2019/002961
§ 371 (c)(1),
(2) Date: Jun. 5, 2020

(87) PCT Pub. No.: WO2019/151246
PCT Pub. Date: Aug. 8, 2019

(65) Prior Publication Data
US 2021/0163333 A1    Jun. 3, 2021

(30) Foreign Application Priority Data

Jan. 31, 2018 (JP) .................. 2018-015106

(51) Int. Cl.
*C03B 35/16* (2006.01)
*B65H 18/28* (2006.01)
*C03B 17/06* (2006.01)

(52) U.S. Cl.
CPC ........... *C03B 17/067* (2013.01); *B65H 18/28* (2013.01); *C03B 17/064* (2013.01);
(Continued)

(58) Field of Classification Search
CPC .................................................. C03B 17/064
See application file for complete search history.

(56) References Cited

U.S. PATENT DOCUMENTS 6,502,423 B1 * 1/2003 Ostendarp ............. C03B 17/068
65/176
8,935,942 B2 * 1/2015 Eta ....................... C03B 33/0215
65/53
(Continued)

FOREIGN PATENT DOCUMENTS

JP    2017-077995    4/2017
WO    WO-2017147223 A1 *    8/2017    ......... C03B 33/0235

OTHER PUBLICATIONS

International Search Report dated May 7, 2019 in International (PCT) Application No. PCT/JP2019/002961.
(Continued)

*Primary Examiner* — Jodi C Franklin
(74) *Attorney, Agent, or Firm* — WENDEROTH, LIND & PONACK, L.L.P.

(57) ABSTRACT

A glass roll of band-shaped glass film is free of skew and single slack when a roll-to-roll mode is used. The band-shaped glass film is wound into a roll shape and has creases formed thereon. The band-shaped glass film includes an effective section with two side edges in a width direction extending parallel to each other, and leading and trailing end portions extending parallel to the width direction. When a length from the leading end portion to the trailing end portion along a surface of the effective section is measured along each of a first position along one side edge and a second position along another side edge, a difference between the first and second measurement lengths is 400 ppm or less of a longer measurement length of the first and second measurement lengths.

16 Claims, 10 Drawing Sheets

(52) U.S. Cl.
CPC ............ *C03B 17/068* (2013.01); *C03B 35/16* (2013.01); *B65H 2301/51536* (2013.01); *B65H 2511/11* (2013.01); *B65H 2701/131* (2013.01); *B65H 2701/17* (2013.01)

(56) References Cited

U.S. PATENT DOCUMENTS

| | | | | |
|---|---|---|---|---|
| 9,260,336 | B2* | 2/2016 | Tamamura | C03B 17/065 |
| 9,643,878 | B2* | 5/2017 | Fujii | C03B 23/023 |
| 9,790,121 | B2* | 10/2017 | Abramov | C03B 35/243 |
| 11,192,743 | B2* | 12/2021 | Mori | C03B 33/0235 |
| 11,346,652 | B2* | 5/2022 | Mitsugi | G01B 11/04 |
| 2004/0154336 | A1* | 8/2004 | Pitbladdo | C03B 17/064 |
| | | | | 65/195 |
| 2011/0197634 | A1* | 8/2011 | Eta | C03B 17/06 |
| | | | | 65/185 |
| 2011/0198378 | A1* | 8/2011 | Chang | B65G 49/063 |
| | | | | 226/7 |
| 2012/0024929 | A1* | 2/2012 | Teranishi | C03B 35/161 |
| | | | | 226/189 |
| 2012/0304695 | A1* | 12/2012 | Lakota | C03B 17/064 |
| | | | | 65/97 |
| 2013/0126576 | A1* | 5/2013 | Marshall | C03B 33/091 |
| | | | | 225/2 |
| 2014/0065450 | A1* | 3/2014 | Senoue | H01M 4/661 |
| | | | | 429/211 |
| 2014/0367030 | A1* | 12/2014 | Beam | B32B 7/06 |
| | | | | 156/719 |
| 2015/0344347 | A1* | 12/2015 | Fleming | B65H 23/0204 |
| | | | | 242/615.1 |
| 2016/0122228 | A1* | 5/2016 | Teranishi | C03B 33/091 |
| | | | | 65/355 |
| 2016/0168003 | A1* | 6/2016 | Hasegawa | C03B 33/0235 |
| | | | | 65/184 |
| 2016/0238372 | A1* | 8/2016 | Imanishi | G01N 21/956 |
| 2017/0001898 | A1* | 1/2017 | Ortner | C03B 18/04 |
| | | | | 65/184 |
| 2017/0087599 | A1* | 3/2017 | Akiyama | C03C 23/0075 |
| 2017/0183258 | A1* | 6/2017 | Ottermann | B65H 18/28 |
| 2017/0305777 | A1* | 10/2017 | Black | C03B 17/064 |
| 2018/0036838 | A1* | 2/2018 | Hamamura | B23K 26/364 |
| 2018/0066362 | A1* | 3/2018 | Okami | G11B 5/85 |
| 2018/0297884 | A1* | 10/2018 | Aburada | C03B 17/067 |
| 2018/0305246 | A1* | 10/2018 | Hung | C03B 25/12 |
| 2019/0047895 | A1* | 2/2019 | Kuhn | G06T 7/0004 |
| 2019/0352115 | A1* | 11/2019 | Mori | B65H 23/28 |
| 2020/0232932 | A1* | 7/2020 | Kim | G01N 21/95 |
| 2022/0013857 | A1* | 1/2022 | Visco | C03C 17/22 |

OTHER PUBLICATIONS

International Preliminary Report on Patentability and Written Opinion of the International Searching Authority dated Aug. 4, 2020 in International (PCT) Application No. PCT/JP2019/002961.

* cited by examiner

GLASS ROLL, GLASS ROLL MANUFACTURING METHOD, AND QUALITY EVALUATION METHOD

TECHNICAL FIELD

The present invention relates to a glass roll, a glass roll manufacturing method, and a glass roll quality evaluation method.

BACKGROUND ART

As is well known, mobile devices, such as smartphones and tablet PCs, which have been rapidly spreading in recent years are required to be small in weight. Therefore, under the actual circumstances, glass substrates adopted in such devices are being reduced in thickness. As a result, a glass film obtained by reducing a thickness of a glass substrate to a thickness of a film (for example, a thickness of 300 μm or less) has been developed and manufactured.

The glass film is extremely small in thickness and hence has such flexibility that allows the glass film to be easily bent by hand. With this, for example, a glass roll can be manufactured by winding up a band-shaped glass film, which is continuously formed by an overflow down-draw method, around a winding core into a roll shape. In addition, in this glass roll, the band-shaped glass film may also be subjected to various processes (for example, division of unnecessary portions) through use of a roll-to-roll mode (see Patent Literature 1).

In the roll-to-roll mode, a band-shaped glass film wound around a first winding core as a glass roll is unwound from the first winding core and processed while being conveyed. After that, the processed band-shaped glass film is wound up around a second winding core different from the first winding core to obtain a glass roll again.

CITATION LIST

Patent Literature 1: JP 2017-077995 A

SUMMARY OF INVENTION

Technical Problem

Incidentally, when the above-mentioned roll-to-roll mode is used, there are the following problems to be solved.

Specifically, when the roll-to-roll mode is used, as illustrated in FIG. 10a, a band-shaped leader 200 for pulling and guiding a band-shaped glass film 100 to a second winding core (not shown) may be coupled to the band-shaped glass film 100 through intermediation of a tape 300. In such a case, in order to appropriately perform processing on the band-shaped glass film 100, it is ideal that the subsequent band-shaped glass film 100 pass through, without deviation, a passage line through which the preceding leader 200 has passed. However, as illustrated in FIG. 10b, due to excessive skew of the band-shaped glass film 100 (indicated by the outlined arrows in FIG. 10b), a passage line of the band-shaped glass film 100 deviates in a width direction, and in some cases, does not match with the passage line of the leader 200 (indicated by the two-dot chain lines in FIG. 10b). As a result, there is a defect in that the processing cannot be appropriately performed.

Further, as illustrated in FIG. 11a, when nip rollers 600 formed of a pair of rollers configured to nip the band-shaped glass film 100 in a thickness direction of the band-shaped glass film 100 is arranged on a conveyance path of the band-shaped glass film 100 extending from a first winding core 400 to a second winding core 500, there also occurs a problem caused by slack of the band-shaped glass film 100. Specifically, as illustrated in FIG. 11b, slack occurs in only one of end portions in a width direction of the band-shaped glass film 100 (hereinafter referred to as "single slack") on an immediate upstream side of the nip rollers 600 on the conveyance path, and the single slack gradually deteriorates, with the result that the band-shaped glass film 100 may be broken.

The present invention that has been made in view of the above-mentioned circumstances has a technical object to provide a glass roll in which the occurrence of skew and single slack in a band-shaped glass film can be prevented when the roll-to-roll mode is used.

Solution to Problem

As a result of extensive studies, the inventors of the present invention have found that the occurrence of skew and single slack in the band-shaped glass film in the case of using the roll-to-roll mode is caused by creases formed on the band-shaped glass film. Then, the inventors of the present invention have found that, when the balance in number and size of the creases is unsatisfactory between the creases present in one side end portion in a width direction of the band-shaped glass film and the creases present in another side end portion thereof, skew and single slack are liable to occur. The above-mentioned creases may be present not only on the band-shaped glass film but also on, for example, a band-shaped resin film having a similar shape. However, even when the roll-to-roll mode is used for the band-shaped resin film, skew and single slack are less liable to occur. This is because of the following reason. The resin is rich in stretchability, and the creases are stretched by application of tension to the band-shaped resin film at the time of using the roll-to-roll mode. Thus, even when the above-mentioned balance is unsatisfactory, the influence thereof is small. Meanwhile, the creases formed on the band-shaped glass film are hardly stretched even with application of tension at the time of using the roll-to-roll mode. Therefore, when the above-mentioned balance is unsatisfactory, the influence caused by the creases cannot be eliminated, and skew and single slack are liable to occur.

According to the present invention which has been made based on the findings described above to solve the above-mentioned problem, there is provided a glass roll comprising a band-shaped glass film which is wound into a roll shape and has creases formed thereon, wherein the band-shaped glass film comprises an effective section in which one side edge and another side edge in a width direction extend in parallel to each other, and in which each of a leading end portion and a trailing end portion extends in parallel to the width direction of the band-shaped glass film, and wherein, when a length from the leading end portion to the trailing end portion along a surface of the effective section is measured along each of a first position along the one side edge of the band-shaped glass film and a second position along the another side edge of the band-shaped glass film, a difference between a first measurement length and a second measurement length which are respectively measured along the first position and the second position is 400 ppm or less of a longer measurement length of the first measurement length and the second measurement length.

In the glass roll of the present invention, the first measurement length and the second measurement length are each obtained by measuring the length from the leading end portion to the trailing end portion of the effective section along the surface of the effective section in the band-shaped glass film. When measurement along the surface is performed as described above, the influence of irregularities on the surface caused by the creases is reflected on the measurement results of both the measurement lengths, and the number quantity and size magnitude of the creases present between the leading end portion and the trailing end portion of the effective section along each of the first position and the second position are reflected as the magnitude of the measurement lengths on the measurement results. In this case, the first position and the second position are a position along the one side edge and a position along the another side edge in the width direction of the band-shaped glass film, respectively. In view of the foregoing, when the difference between the measurement lengths is found, the validity of the balance in number and size of the creases between the one side end portion and the another side end portion in the width direction of the band-shaped glass film is determined based on the magnitude of the difference. When the difference between both the measurement lengths is smaller, the balance is more satisfactory. Here, as a result of extensive studies, the inventors of the present invention have found that, when the roll-to-roll mode is used for the glass roll in which the difference between both the measurement lengths is 400 ppm or less of the longer measurement length of both the measurement lengths, the occurrence of skew and single slack in the band-shaped glass film can be prevented. As described above, according to the glass roll of the present invention, when the roll-to-roll mode is used, the occurrence of skew and single slack in the band-shaped glass film can be prevented.

In the glass roll of the present invention, both the first measurement length and the second measurement length are measured in the effective section in which the one side edge and the another side edge in the width direction of the band-shaped glass film extend in parallel to each other, and in which each of the leading end portion and the trailing end portion extends in parallel to the width direction of the band-shaped glass film. With this, the difference between lengths of the one side end portion and the another side end portion (lengths along a longitudinal direction of the band-shaped glass film), as well as the validity of the balance in number and size of the creases between the one side end portion and the another side end portion in the width direction of the band-shaped glass film, are prevented from being reflected as the difference between both the measurement lengths. For example, unlike the case of the glass roll of the present invention, when the lengths from the leading end portion to the trailing end portion of the band-shaped glass film along the surface of the band-shaped glass film are measured along the first position and the second position, instead of the effective section, to be defined as both the measurement lengths, the following defects may occur. Specifically, in the case in which the length of the one side end portion and the length of the another side end portion in the width direction of the band-shaped glass film are different from each other, even when the balance in number and size of the creases between the one side end portion and the another side end portion is satisfactory, the difference between both the measurement lengths may be increased by being added with the difference in length between the one side end portion and the another side end portion. Therefore, there is a risk in that the validity of the balance may not be accurately determined based on the difference between both the measurement lengths. In order to eliminate such risk, both the measurement lengths are measured in the effective section as described above.

In the above-mentioned glass roll, it is preferred that the difference between the first measurement length and the second measurement length be 200 ppm or less of the longer measurement length of the first measurement length and the second measurement length.

With this, the balance in number and size of the creases between the one side end portion and the another side end portion in the width direction of the band-shaped glass film becomes further satisfactory. Therefore, when the roll-to-roll mode is used, the above-mentioned configuration is more advantageous for preventing the occurrence of skew and single slack in the band-shaped glass film.

In the above-mentioned glass roll, it is preferred that the difference between the first measurement length and the second measurement length be 100 ppm or less of the longer measurement length of the first measurement length and the second measurement length.

With this, the balance in number and size of the creases between the one side end portion and the another side end portion in the width direction of the band-shaped glass film becomes even further satisfactory. Therefore, when the roll-to-roll mode is used, the above-mentioned configuration is even more advantageous for preventing the occurrence of skew and single slack in the band-shaped glass film.

In the above-mentioned glass roll, it is preferred that, when a length from the leading end portion to the trailing end portion along the surface of the effective section is measured as a third measurement length along a widthwise center line prevented from having the creases on the band-shaped glass film in addition to the first measurement length and the second measurement length, a larger difference of a difference between the first measurement length and the third measurement length and a difference between the second measurement length and the third measurement length is 500 ppm or less of a longest measurement length of the first measurement length, the second measurement length, and the third measurement length.

When processing is performed on the band-shaped glass film through use of the roll-to-roll mode, it is desired that the number and size of the creases formed on the band-shaped glass film be suppressed to the extent possible in order to suitably perform the processing. In this case, as described above, the number quantity and size magnitude of the creases present between the leading end portion and the trailing end portion of the effective section are reflected as the magnitude of the measurement length on the measurement results of the first measurement length and the second measurement length. Meanwhile, the third measurement length is obtained by measuring the length from the leading end portion to the trailing end portion of the effective section along the flat widthwise center line prevented from having the creases. That is, the influence of irregularities on the surface caused by the creases is not reflected on the measurement result of the third measurement length. In view of the foregoing, in the case in which the difference between the first measurement length and the third measurement length, and the difference between the second measurement length and the third measurement length are each found, when these differences are smaller, the number and size of the creases present in each of the one side end portion and the another side end portion in the width direction of the band-shaped glass film are more suppressed. As a result of extensive studies, the inventors of the present invention have found that, when the roll-to-roll mode is used for the glass roll in which the larger difference of the above-mentioned two differences is 500 ppm or less of the longest measurement length of the first measurement length to the third measurement length, the band-shaped glass film can be suitably processed. As described above, according to the glass roll of the present invention, the above-mentioned configuration is advantageous for suitably performing processing on the band-shaped glass film through use of the roll-to-roll mode.

In the above-mentioned glass roll, it is preferred that the larger difference be 300 ppm or less of the longest measurement length of the first measurement length, the second measurement length, and the third measurement length.

With this, the number and size of the creases present in each of the one side end portion and the another side end portion in the width direction of the band-shaped glass film are further suppressed. Thus, the above-mentioned configuration is further advantageous for suitably performing processing on the band-shaped glass film through use of the roll-to-roll mode.

In the above-mentioned glass roll, it is preferred that the larger difference be 200 ppm or less of the longest measurement length of the first measurement length, the second measurement length, and the third measurement length.

With this, the number and size of the creases present in each of the one side end portion and the another side end portion in the width direction of the band-shaped glass film are even further suppressed. Thus, the above-mentioned configuration is even further advantageous for suitably performing processing on the band-shaped glass film through use of the roll-to-roll mode.

Further, according to the present invention which has been made to solve the above-mentioned problem, there is provided a glass roll manufacturing method, comprising: a forming step of cooling and solidifying a glass ribbon, which is obtained by forming molten glass into a band shape with a forming trough, while pulling the glass ribbon in a longitudinal direction, to thereby obtain a band-shaped glass film having creases formed thereon; a dividing step of dividing both unnecessary portions that are respectively present at both ends in a width direction of the band-shaped glass film from an effective portion positioned between both the unnecessary portions; a winding step of winding up the divided band-shaped glass film formed of the effective portion into a roll shape, to thereby obtain a glass roll; and a measurement step of measuring, in a section to be measured which is formed along a longitudinal direction of the effective portion and in which each of a leading end portion and a trailing end portion extends in parallel to the width direction of the band-shaped glass film, a length from the leading end portion to the trailing end portion along a surface of the section to be measured along each of one side end portion and another side end portion in a width direction of the effective portion, wherein, when a difference between a first measurement length and a second measurement length which are respectively measured along the one side end portion and the another side end portion is more than 400 ppm of a longer measurement length of the first measurement length and the second measurement length, a first adjusting step of adjusting to reduce the difference between the first measurement length and the second measurement length is performed.

According to the method of the present invention, when the measurement step is performed, the validity of the balance in number and size of the creases between the one side end portion and the another side end portion in the width direction of the effective portion to be wound up as the divided band-shaped glass film is found as the difference between both the first measurement length and the second measurement length. When the difference between both the measurement lengths is more than 400 ppm of the longer measurement length of both the measurement lengths, that is, when the balance is unsatisfactory, the first adjusting step is performed. With this, the difference between both the measurement lengths is adjusted to be reduced, thereby improving the balance. As a result, it is possible to manufacture the glass roll by winding up the divided band-shaped glass film formed of the effective portion having satisfactory balance. When the roll-to-roll mode is used for this glass roll, the occurrence of skew and single slack in the divided band-shaped glass film can be suitably prevented.

In the above-mentioned glass roll manufacturing method, it is preferred that the first adjusting step comprise a step of adjusting to reduce a difference between speeds at which both one side end portion and another side end portion in a width direction of the glass ribbon respectively connected to the one side end portion and the another side end portion of the effective portion are cooled and solidified.

As a result of extensive studies, the inventors of the present invention have found that the deterioration of the balance in number and size of the creases between the one side end portion and the another side end portion in the width direction of the effective portion is caused by a difference between speeds at which both the one side end portion and the another side end portion in the width direction of the glass ribbon respectively connected to the one side end portion and the another side end portion of the effective portion are cooled and solidified. With this, when the difference between both the measurement lengths is more than 400 ppm of the longer measurement length of both the measurement lengths, the first adjusting step is performed to adjust to reduce the difference between the speeds at which the one side end portion and the another side end portion of the glass ribbon are cooled and solidified, thereby being capable of effectively improving the balance.

In the above-mentioned glass roll manufacturing method, it is preferred that, when the difference between the first measurement length and the second measurement length is more than 400 ppm of the longer measurement length, both the measurement step and the first adjusting step be alternately performed until the difference between the first measurement length and the second measurement length reaches 400 ppm or less of the longer measurement length while the section to be measured is changed to a new section every time the measurement step is performed.

With this, the effective portion having satisfactory balance in number and size of the creases between the one side end portion and the another side end portion in the width direction can be reliably formed. Therefore, it is possible to reliably manufacture the glass roll in which the divided band-shaped glass film formed of the effective portion having satisfactory balance is wound.

In the above-mentioned glass roll manufacturing method, it is preferred that the measurement step comprise measuring a length from the leading end portion to the trailing end portion along the surface of the section to be measured as a third measurement length along a center portion prevented from having the creases positioned between the one side end portion and the another side end portion of the effective portion in addition to the first measurement length and the second measurement length, and, when at least one of two differences comprising a difference between the first measurement length and the third measurement length and a difference between the second measurement length and the third measurement length is more than 500 ppm of a longest measurement length of the first measurement length, the second measurement length, and the third measurement length, a second adjusting step of adjusting to reduce the difference that is more than 500 ppm of the longest measurement length out of the two differences be performed.

With this, the difference between the first measurement length and the third measurement length, and the difference between the second measurement length and the third measurement length can be found in association with performance of the measurement step. It is determined whether or not the number and size of the creases are suppressed in each of the one side end portion and the another side end portion in the width direction of the effective portion (divided band-shaped glass film) based on the two differences. When at least one of the two differences is more than 500 ppm of the longest measurement length of the first measurement length to the third measurement length, that is, when the number and size of the creases are not sufficiently suppressed, the second adjusting step is performed. With this, of the two differences, the difference that is more than 500 ppm of the longest measurement length is adjusted to be reduced, thereby suppressing the number and size of the creases. As a result, it is possible to form the effective portion in which the number and size of the creases present in the one side end portion and the another side end portion are suppressed to the extent possible, and it is possible to manufacture the glass roll in which the divided band-shaped glass film formed of the effective portion is wound. Then, when the roll-to-roll mode is used for the glass roll, processing on the divided band-shaped glass film can be suitably performed.

In the above-mentioned glass roll manufacturing method, it is preferred that the second adjusting step be a step of adjusting to reduce a difference between speeds at which the one side end portion and the another side end portion of the glass ribbon are cooled and solidified and a speed at which the center portion positioned between both the one side end portion and the another side end portion is cooled and solidified.

As a result of extensive studies, the inventors of the present invention have found that the insufficient suppression of the number and size of the creases in the one side end portion and the another side end portion of the effective portion is caused by differences between speeds at which the one side end portion and the another side end portion of the glass ribbon are cooled and solidified and a speed at which the center portion positioned between both the end portions is cooled and solidified. Therefore, when at least one of the two differences is more than 500 ppm of the longest measurement length of the first measurement length to the third measurement length, the differences between the speeds at which the one side end portion and the another side end portion of the glass ribbon are cooled and solidified and the speed at which the center portion thereof is cooled and solidified are adjusted to be reduced by performing the second adjusting step. With this, the number and size of the creases can be effectively suppressed.

In the above-mentioned glass roll manufacturing method, it is preferred that, when at least one of the two differences is more than 500 ppm of the longest measurement length, both the measurement step and the second adjusting step be alternately performed until both the two differences reach 500 ppm or less of the longest measurement length while the section to be measured is changed to a new section every time the measurement step is performed.

With this, it is possible to reliably form the effective portion in which the balance in number and size of the creases is satisfactory between the one side end portion and the another side end portion in the width direction, and the number and size of the creases present in both the end portions are also sufficiently suppressed. Therefore, it is possible to reliably manufacture the glass roll of high quality comprising the divided band-shaped glass film formed of the effective portion.

In the above-mentioned glass roll manufacturing method, it is preferred that a measurement unit be used for measuring each of the measurement lengths, and the measurement unit comprise a rotating body which is allowed to move in a thickness direction of the section to be measured in conformity with irregularities on the surface of the section to be measured caused by the creases while rotating through friction with the surface of the section to be measured under a state of being held in contact with the surface of the section to be measured, and be configured to measure each of the measurement lengths based on a distance by which the rotating body rolls on the surface of the section to be measured.

With this, the rotating body provided to the measurement unit can move in the thickness direction of the section to be measured in conformity with the irregularities on the surface of the section to be measured. Therefore, when each of the measurement lengths is measured, the risk in that the creases are pressurized to be crushed with a force applied to the creases can be reliably eliminated. With this, the influence of the irregularities on the surface caused by the creases can be accurately reflected on the measurement result of each of the measurement lengths, and by extension, the measurement accuracy of each of the measurement lengths can be improved.

In the above-mentioned glass roll manufacturing method, it is preferred that the section to be measured be divided from the effective portion and discarded.

With this, the section to be measured in which the surface may have been contaminated through contact with the rotating body provided to the measurement unit is discarded without forming a part of the divided band-shaped glass film (effective portion) forming the glass roll. Therefore, it is possible to manufacture the glass roll comprising only the divided band-shaped glass film in which the surface is in a clean state.

In the above-mentioned glass roll manufacturing method, it is preferred that a speed at which each part is cooled and solidified through use of three heating units that are respectively configured to heat the one side end portion, the another side end portion, and the center portion positioned between the one side end portion and the another side end portion of the glass ribbon be adjusted.

With this, the speeds at which the one side end portion, the another side end portion, and the center portion of the glass ribbon are cooled and solidified can be easily adjusted individually. Therefore, the above-mentioned configuration is advantageous for manufacturing the glass roll of higher quality.

Further, according to the present invention, there is provided a glass roll quality evaluation method, comprising: a sampling step of extracting a sample glass roll from a plurality of glass rolls manufactured under the same condition; a measuring step of measuring, in an effective section in which one side edge and another side edge in a width direction of a band-shaped glass film forming the sample glass roll and having creases formed thereon extend in parallel to each other and in which each of a leading end portion and a trailing end portion extends in parallel to the width direction of the band-shaped glass film, a length from the leading end portion to the trailing end portion along a surface of the effective section along each of one side end portion and another side end portion in the width direction of the band-shaped glass film through use of a roll-to-roll mode; and a determination step of determining validity of quality of the plurality of glass rolls excluding the sample glass roll based on a difference between one side measurement length and another side measurement length which are respectively measured along the one side end portion and the another side end portion.

According to the method of the present invention, through performance of the measuring step, the validity of the balance in number and size of the creases between the one side end portion and the another side end portion in the width direction of the band-shaped glass film forming the sample glass roll is found as the difference between both the one side measurement length and the another side measurement length. When the difference between both the measurement lengths is smaller, the balance is more satisfactory. When the roll-to-roll mode is used, skew and single slack are less liable to occur in the band-shaped glass film. In this case, the sample glass roll is extracted from the plurality of glass rolls in the sampling step, and the plurality of glass rolls are manufactured under the same condition. That is, the sample glass roll and each of the plurality of glass rolls excluding the sample glass roll can be considered to be substantially the same glass rolls. Therefore, when the sample glass roll can prevent the above-mentioned occurrence of skew and single slack, each of the plurality of glass rolls excluding the sample glass roll can also be considered to be able to similarly prevent the occurrence of skew and single slack. As described above, according to the method of the present invention, the quality of the plurality of glass rolls can be suitably evaluated in association with performance of the determination step based on the difference between both the measurement lengths.

In the above-mentioned glass roll quality evaluation method, it is preferred that the determination step comprise determining that the quality of the plurality of glass rolls excluding the sample glass roll is accepted when the difference between the one side measurement length and the another side measurement length is 400 ppm or less of a longer measurement length of the one side measurement length and the another side measurement length.

With this, the band-shaped glass film forming each of the plurality of glass rolls in which the quality has been determined to be accepted in the determination step has sufficiently satisfactory balance in number and size of the creases between the one side end portion and the another side end portion in the width direction. With this, each of the plurality of glass rolls can be evaluated as a glass roll in which the occurrence of skew and single slack in the band-shaped glass film can be suitably prevented when the roll-to-roll mode is used.

In the above-mentioned glass roll quality evaluation method, it is preferred that the measuring step comprise measuring a length from the leading end portion to the trailing end portion along the surface of the effective section as a center measurement length along a center portion prevented from having the creases positioned between the one side end portion and the another side end portion of the band-shaped glass film through use of the roll-to-roll mode in addition to the one side measurement length and the another side measurement length, and, in the determination step, when the difference between the one side measurement length and the another side measurement length is 400 ppm or less of the longer measurement length of the one side measurement length and the another side measurement length, and a larger difference of a difference between the one side measurement length and the center measurement length and a difference between the another side measurement length and the center measurement length is 500 ppm or less of a longest measurement length of the one side measurement length, the another side measurement length, and the center measurement length, it is determined that the quality of the plurality of glass rolls excluding the sample glass roll is accepted as being excellent.

With this, the band-shaped glass film, which forms each of the plurality of glass rolls in which the quality has been determined to be accepted as being excellent in the determination step, has sufficiently satisfactory balance in number and size of the creases between the one side end portion and the another side end portion in the width direction. In addition, the number and size of the creases present in each of the one side end portion and the another side end portion are sufficiently suppressed. Thus, each of the plurality of glass rolls can be evaluated as a glass roll in which the occurrence of skew and single slack in the band-shaped glass film can be suitably prevented when the roll-to-roll mode is used and in which processing can be suitably performed on the band-shaped glass film.

In the above-mentioned glass roll quality evaluation method, it is preferred that a measuring unit be used for measuring each of the measurement lengths, and the measuring unit comprise a rotating body which is allowed to move in a thickness direction of the effective section in conformity with irregularities on the surface of the effective section caused by the creases while rotating through friction with the surface of the effective section under a state of being held in contact with the surface of the effective section, and be configured to measure each of the measurement lengths based on a distance by which the rotating body rolls on the surface of the effective section.

With this, the influence of the irregularities on the surface caused by the creases can be accurately reflected on the measurement result of each of the measurement lengths, and the measurement accuracy of each of the measurement lengths can be improved.

Advantageous Effects of Invention

According to the present invention, a glass roll in which the occurrence of skew and single slack in a band-shaped glass film can be prevented when the roll-to-roll mode is used can be provided.

DESCRIPTION OF EMBODIMENTS

Now, a glass roll, a glass roll manufacturing method, and a glass roll quality evaluation method according to embodiments of the present invention are described with reference to the accompanying drawings.

<Glass Roll>

First, a glass roll is described.

Figure 1:
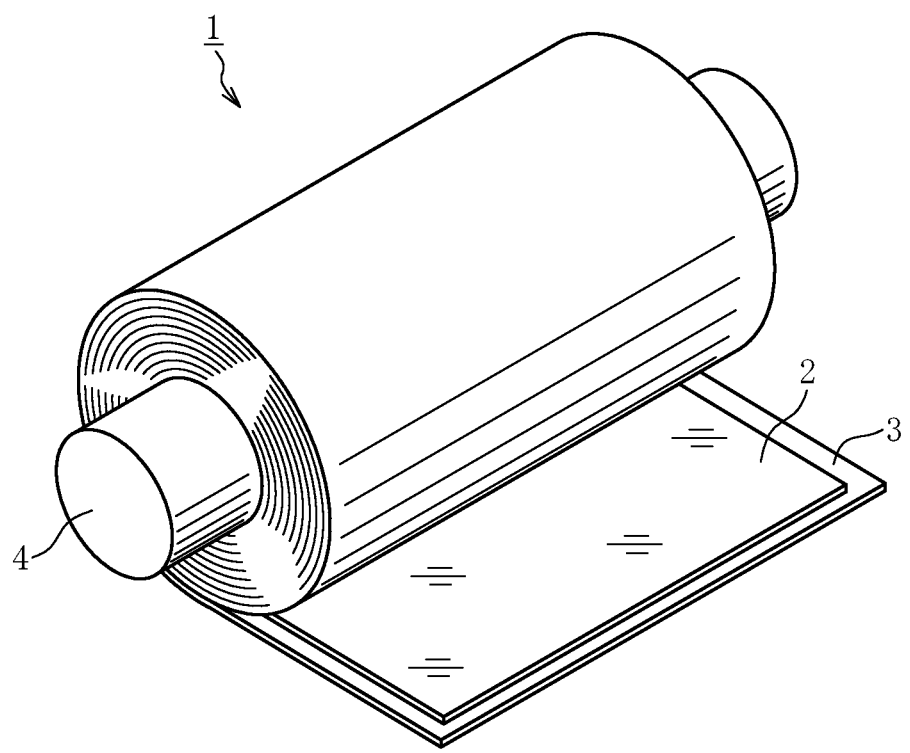
FIG. 1 is a perspective view for illustrating a glass roll according to an embodiment of the present invention.

As illustrated in FIG. 1, a glass roll 1 comprises a band-shaped glass film 2 having flexibility and a band-shaped protective sheet 3 having flexibility. The band-shaped protective sheet 3 is configured to protect the band-shaped glass film 2 from the occurrence of a scratch and the like. The glass roll 1 is formed of the band-shaped glass film 2 and the band-shaped protective sheet 3 wound around a winding core 4 into a roll shape under a state in which the band-shaped glass film 2 and the band-shaped protective sheet 3 are superposed on one another. The band-shaped glass film 2 is formed so as to have a substantially uniform thickness over an entire width thereof, and has a thickness of, for example, 300 μm or less. In addition, the band-shaped glass film 2 has an entire length of, for example, 100 m or more.

Here, in this embodiment, the band-shaped protective sheet 3 has a width dimension larger than that of the band-shaped glass film 2, but the present invention is not limited thereto. As a modification example of this embodiment, both the band-shaped glass film 2 and the band-shaped protective sheet 3 may have the same width dimension, or the band-shaped glass film 2 may have a width dimension larger than that of the band-shaped protective sheet 3.

Figure 2A:
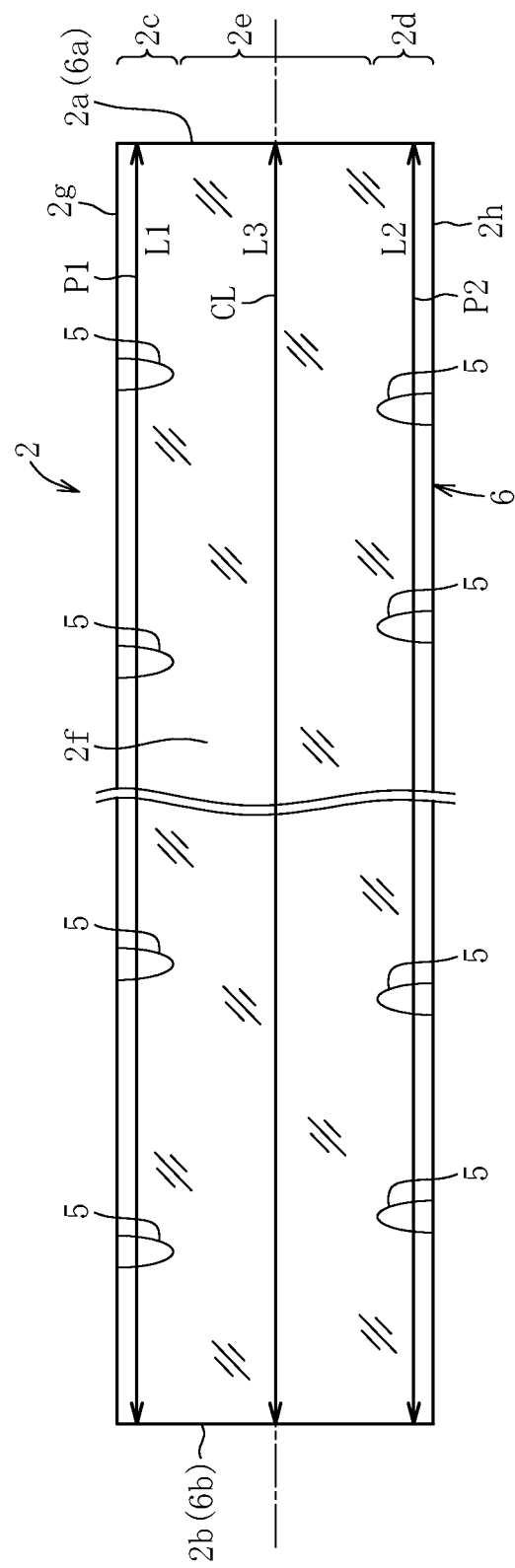
FIG. 2a is a plan view for illustrating a state in which a band-shaped glass film forming the glass roll according to the embodiment of the present invention is imaginarily unwound over an entire length from a winding core.

The state in which the band-shaped glass film 2 forming the glass roll 1 is imaginarily unwound over the entire length from the winding core 4 is illustrated in FIG. 2a. As illustrated in FIG. 2a, in the band-shaped glass film 2, a leading end portion 2a that is one end portion along a longitudinal direction of the band-shaped glass film 2 and a trailing end portion 2b that is another end portion thereof are each formed in parallel to a width direction of the band-shaped glass film 2.

The band-shaped glass film 2 is glass formed by cooling and solidifying a glass ribbon, which is obtained by forming molten glass into a band shape, while pulling the glass ribbon in a longitudinal direction as typified by an overflow down-draw method. Edge portions (parts each having a thickness larger than those of other parts) formed at both ends in the width direction along with the forming are divided and removed. The band-shaped glass film 2 comprises one side end portion 2c in the width direction comprising a first position P1 described later, another side end portion 2d comprising a second position P2 described later, and a center portion 2e comprising a widthwise center line CL and being positioned between both the end portions 2c and 2d. In the one side end portion 2c and the another side end portion 2d, creases 5 are formed to cause irregularities to be present on a surface 2f. Meanwhile, in the center portion 2e, the creases 5 are not formed, and the surface 2f is flat.

Here, in this embodiment, the creases 5 are formed in the one side end portion 2c and the another side end portion 2d among three parts comprising the one side end portion 2c, the another side end portion 2d, and the center portion 2e of the band-shaped glass film 2, but the present invention is not limited thereto. As a modification example of this embodiment, the creases 5 may be formed in only one of the three parts. For example, the creases 5 may be formed in only the one side end portion 2c or only the another side end portion 2d.

The band-shaped glass film 2 comprises an effective section 6 in which a first measurement length L1 to a third measurement length L3 described later are to be measured. The effective section 6 is a section in which one side edge 2g and another side edge 2h in the width direction extend in parallel to each other in the band-shaped glass film 2, and a leading end portion 6a and a trailing end portion 6b thereof each extend in parallel to the width direction. That is, the effective section 6 has a rectangular shape in plan view of the band-shaped glass film 2. With this, when the effective section 6 is formed so as to be longest in the band-shaped glass film 2 illustrated in FIG. 2a, the entire length of the band-shaped glass film 2 forms the effective section 6. In this case, the leading end portion 2a of the band-shaped glass film 2 and the leading end portion 6a of the effective section 6 are matched with each other, and the trailing end portion 2b of the band-shaped glass film 2 and the trailing end portion 6b of the effective section 6 are matched with each other.

Figure 2B:
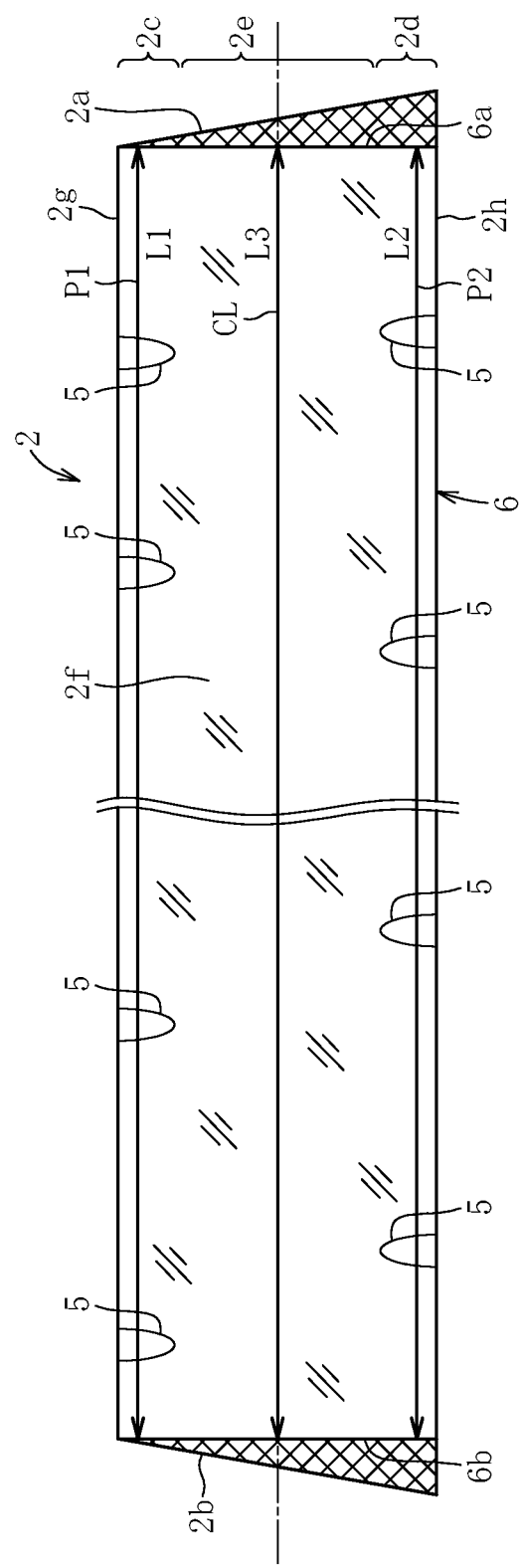
FIG. 2b is a plan view for illustrating a state in which the band-shaped glass film forming the glass roll according to the embodiment of the present invention is imaginarily unwound over an entire length from the winding core.

Here, based on the definition of the effective section 6, when each of the leading end portion 2a and the trailing end portion 2b of the band-shaped glass film 2 extends in a direction inclined with respect to the width direction as illustrated in FIG. 2b as a modification example of this embodiment, the effective section 6 becomes a section obtained by excluding parts indicated by the cross-hatching even when the effective section 6 is formed so as to be longest. In this case, the leading end portion 2a of the band-shaped glass film 2 and the leading end portion 6a of the effective section 6 are not matched with each other, and the trailing end portion 2b of the band-shaped glass film 2 and the trailing end portion 6b of the effective section 6 are not matched with each other.

As is apparent from the description above, the length of the effective section 6 (length along the longitudinal direction of the band-shaped glass film 2) may be set to an arbitrary length. It is preferred that the length of the effective section 6 be set to 20 m or more.

The first measurement length L1, the second measurement length L2, and the third measurement length L3 are lengths obtained by measuring lengths from the leading end portion 6a to the trailing end portion 6b along the surface 2f of the effective section 6, respectively, along the first position P1 along the one side edge 2g of the band-shaped glass film 2, the second position P2 along the another side edge 2h thereof, and the widthwise center line CL thereof. When each of the measurement lengths L1 to L3 is measured along the surface 2f, the influence of the irregularities on the surface 2f caused by the creases 5 is reflected on the measurement results of the first measurement length L1 and the second measurement length L2, and the number quantity and size magnitude of the creases 5 are reflected as the magnitude of the measurement length on the measurement results. Meanwhile, the measurement result of the third measurement length L3 is not influenced by the irregularities on the surface 2f caused by the creases 5.

The first position P1 and the second position P2 are positions respectively apart from the one side edge 2g and the another side edge 2h by 50 mm toward an inner side in the width direction. In this embodiment, the first measurement length L1 and the second measurement length L2 respectively measured along the first position P1 and the second position P2 are measured through use of a roller encoder 7 described later. Therefore, when obstacles that hinder the measurement using the roller encoder 7 are present at the above-mentioned positions apart by 50 mm, the positions apart from the obstacles are respectively defined as the first position P1 and the second position P2 instead. Specifically, positions apart from the obstacles by 10 mm toward an inner side in the width direction are respectively defined as the first position P1 and the second position P2. Examples of the obstacle include a reinforcing tape affixed to the surface 2f along the longitudinal direction in order to reinforce the band-shaped glass film 2.

A difference between the first measurement length L1 and the second measurement length L2 (absolute value of L1-L2) is 400 ppm or less of a longer measurement length of both the measurement lengths L1 and L2. When this condition is satisfied, the balance in number and size of the creases 5 present between the one side end portion 2c and the another side end portion 2d of the band-shaped glass film 2 becomes satisfactory in terms of preventing the occurrence of skew and single slack in the band-shaped glass film 2 when a roll-to-roll mode is used. The difference between both the measurement lengths L1 and L2 is preferably 200 ppm or less of the longer measurement length, more preferably 100 ppm or less of the longer measurement length.

In addition, of a difference between the first measurement length L1 and the third measurement length L3 (absolute value of L1-L3) and a difference between the second measurement length L2 and the third measurement length L3 (absolute value of L2-L3), a larger difference is 500 ppm or less of a longest measurement length of the first measurement length L1 to the third measurement length L3. When this condition is satisfied, the number and size of the creases 5 present in each of the one side end portion 2c and the another side end portion 2d of the band-shaped glass film 2 are sufficiently suppressed in terms of suitably performing processing on the band-shaped glass film 2 when the roll-to-roll mode is used. The above-mentioned larger difference is preferably 300 ppm or less of the longest measurement length, more preferably 200 ppm or less of the longest measurement length.

<Measurement Mode of First Measurement Length to Third Measurement Length>

Now, the measurement mode of the first measurement length L1 to the third measurement length L3 is described.

Figure 3:
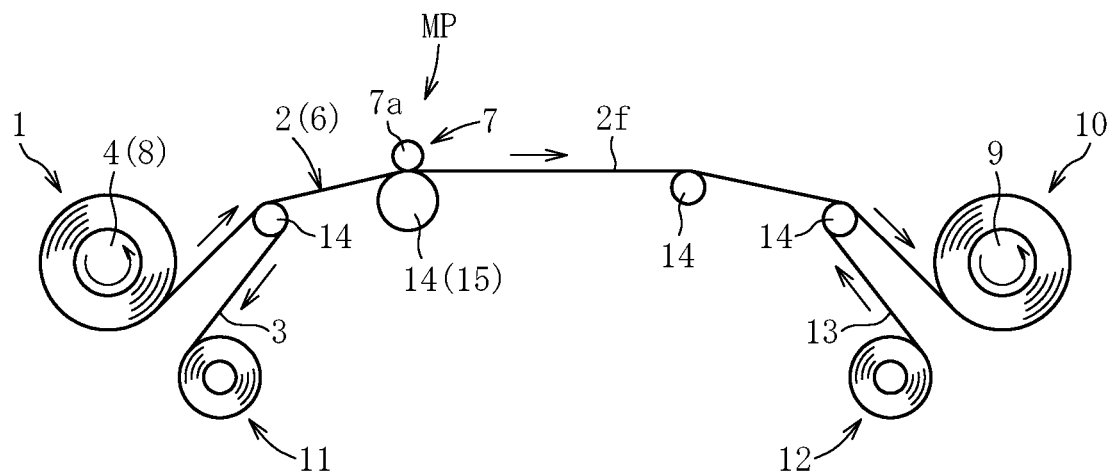
FIG. 3 is a side view for illustrating a mode of measuring a first measurement length to a third measurement length in the glass roll according to the embodiment of the present invention.

For example, as illustrated in FIG. 3, the first measurement length L1 to the third measurement length L3 are measured in the glass roll 1 according to this embodiment through use of the roll-to-roll mode. Specifically, each of the measurement lengths L1 to L3 is measured at a measurement position MP on a conveyance path while the band-shaped glass film 2 forming the glass roll 1 is unwound and conveyed from a first winding core 8 serving as the winding core 4. After that, the band-shaped glass film 2 having passed through the measurement position MP is wound up around a second winding core 9 different from the first winding core 8 to obtain a glass roll 10 again.

The leading end portion 2a of the band-shaped glass film 2 is coupled to a trailing end portion of a band-shaped leader (not shown) that is wound up around the second winding core 9 ahead of the band-shaped glass film 2. That is, the band-shaped glass film 2 is conveyed by being pulled by the leader.

The band-shaped protective sheet 3 superposed on the band-shaped glass film 2 in the glass roll 1 is unwound from the first winding core 8 together with the band-shaped glass film 2. After that, the band-shaped protective sheet 3 is separated from the band-shaped glass film 2 and collected as a first sheet roll 11. In addition, the band-shaped glass film 2 having passed through the measurement position MP is wound up around the second winding core 9 under a state of being superposed on a band-shaped protective sheet 13 supplied from a second sheet roll 12.

The band-shaped glass film 2 being conveyed to the second winding core 9 after being unwound from the first winding core 8 is in a state of being stretched over a plurality of rollers 14 arranged along the conveyance path. In each of the plurality of rollers 14, an axis extends along the width direction of the band-shaped glass film 2. Each of the plurality of rollers 14 may be a drive roller connected to a drive source (for example, a motor) or may be a free roller.

Of the plurality of rollers 14, a roller 15 arranged at the measurement position MP is arranged so as to nip the band-shaped glass film 2 that passes through the measurement position MP in a horizontal posture in the thickness direction together with a roller 7a provided to the roller encoder 7. Specifically, the roller 15 is brought into abutment against the band-shaped glass film 2 from below, and the roller 7a is brought into abutment against the band-shaped glass film 2 from above. The diameter of the roller 15 is set to be larger than that of the roller 7a.

Here, as a modification example of this embodiment, the roller 15 may be brought into abutment against the band-shaped glass film 2 from above, and the roller 7a provided to the roller encoder 7 may be brought into abutment against the band-shaped glass film 2 from below.

The roller encoder 7 functions as a measuring unit configured to measure each of the measurement lengths L1 to L3. The roller 7a serving as a rotating body provided to the roller encoder 7 is allowed to rotate without sliding through friction with the surface 2f of the effective section 6 under a state of being always held in abutment against the surface 2f. Each of the measurement lengths L1 to L3 is measured based on a distance by which the roller 7a rolls on the surface 2f. Further, there is no particular limitation on a material for a rotation peripheral portion of the roller 7a that is brought into abutment against the surface 2f. However, it is required to eliminate a risk in that each of the measurement lengths L1 to L3 is inaccurately measured due to sliding between the surface 2f and the rotation peripheral portion. Therefore, in this embodiment, silicon rubber that is suitable for preventing sliding is used as the material for the rotation peripheral portion.

Figure 4:
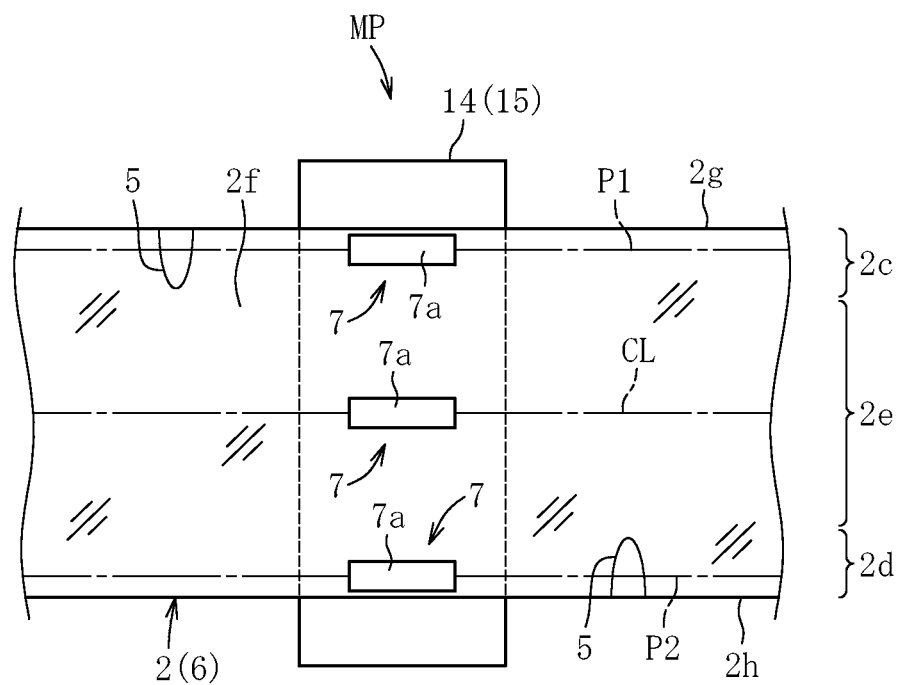
FIG. 4 is a plan view for illustrating the mode of measuring the first measurement length to the third measurement length in the glass roll according to the embodiment of the present invention.

As illustrated in FIG. 4, there are arranged three roller encoders 7 configured to respectively measure the first measurement length L1, the second measurement length L2, and the third measurement length L3 to be measured along the first position P1, the second position P2, and the widthwise center line CL. Three rollers 7a respectively provided to the three roller encoders 7 are arranged along the width direction of the band-shaped glass film 2, and are positioned at the same point on the conveyance path of the band-shaped glass film 2.

Figure 5A:
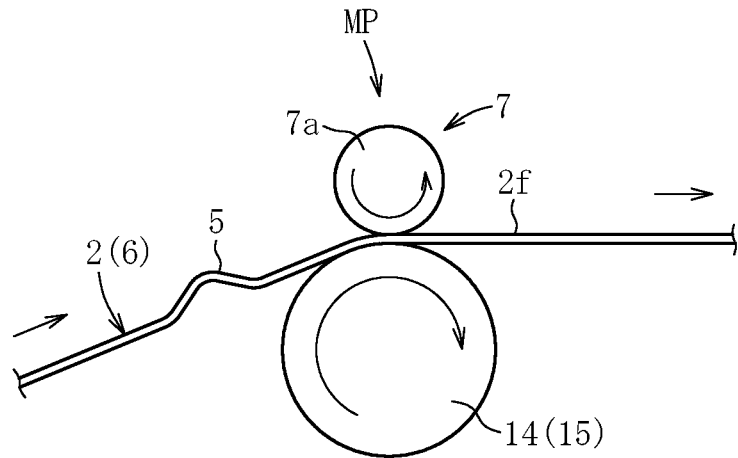
FIG. 5a is a side view for illustrating the mode of measuring the first measurement length to the third measurement length in the glass roll according to the embodiment of the present invention under a state in which the periphery of a roller encoder is enlarged.
Figure 5B:
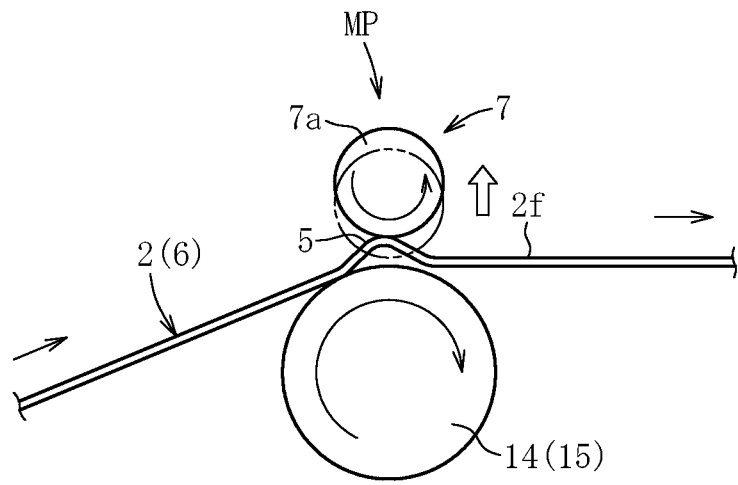
FIG. 5b is a side view for illustrating the mode of measuring the first measurement length to the third measurement length in the glass roll according to the embodiment of the present invention under the state in which the periphery of the roller encoder is enlarged.
Figure 5C:
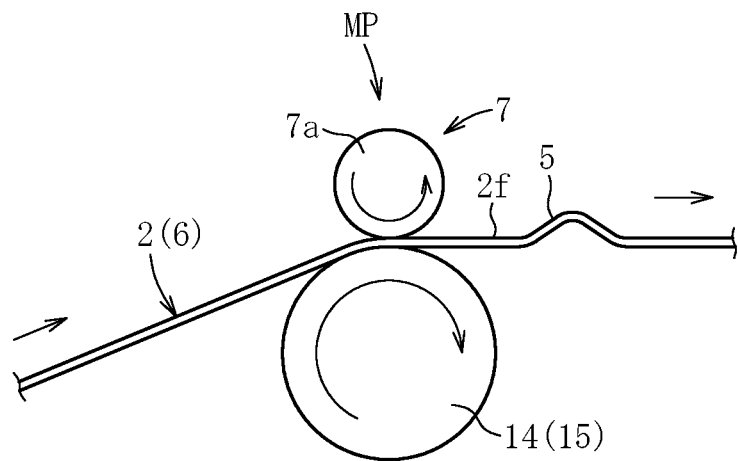
FIG. 5c is a side view for illustrating the mode of measuring the first measurement length to the third measurement length in the glass roll according to the embodiment of the present invention under the state in which the periphery of the roller encoder is enlarged.

As illustrated in FIG. 5a to FIG. 5c, the roller 7a provided to each of the roller encoders 7 can move in the thickness direction of the effective section 6 in conformity with the irregularities on the surface 2f of the effective section 6 caused by the creases 5. Thus, as illustrated in FIG. 5a to FIG. 5c, when the roller 7a climbs over the crease 5 having reached the measurement position MP along with conveyance of the band-shaped glass film 2, the roller 7a moves upward from an initial position indicated by the two-dot chain line to a position indicated by the solid line in FIG. 5b. The "initial position" corresponds to a position given when the roller 7a rolls on a flat part without the creases 5 in the effective section 6. In addition, the roller 7a is configured to always apply a certain load (load that acts in the thickness direction of the band-shaped glass film 2) to the effective section 6. The magnitude of the load is set to such a degree that the roller 7a does not crush and flatten the crease 5 while the state in which the roller 7a and the surface 2f are always held in abutment against each other can be maintained.

As a modification example of this embodiment, the magnitude of the load applied by the roller 7a applies to the effective section 6 may be set to such a degree that the roller 7a crushes and flattens the crease 5. Also in this case, the first measurement length L1, the second measurement length L2, and the third measurement length L3 can be measured without any problem.

When the rollers 7a respectively provided to the roller encoders 7 finish rolling from the leading end portion 2a to the trailing end portion 2b along the surface 2f of the effective section 6 on the first position P1, the second position P2, and the widthwise center line CL, each of the measurement lengths L1 to L3 is measured. As a result, the difference between both the measurement lengths L1 and L2, the difference between the first measurement length L1 and the third measurement length L3, and the difference between the second measurement length L2 and the third measurement length L3 are found.

<Glass Roll Manufacturing Method>

Now, a manufacturing method for manufacturing the glass roll 1 is described.

Figure 6:
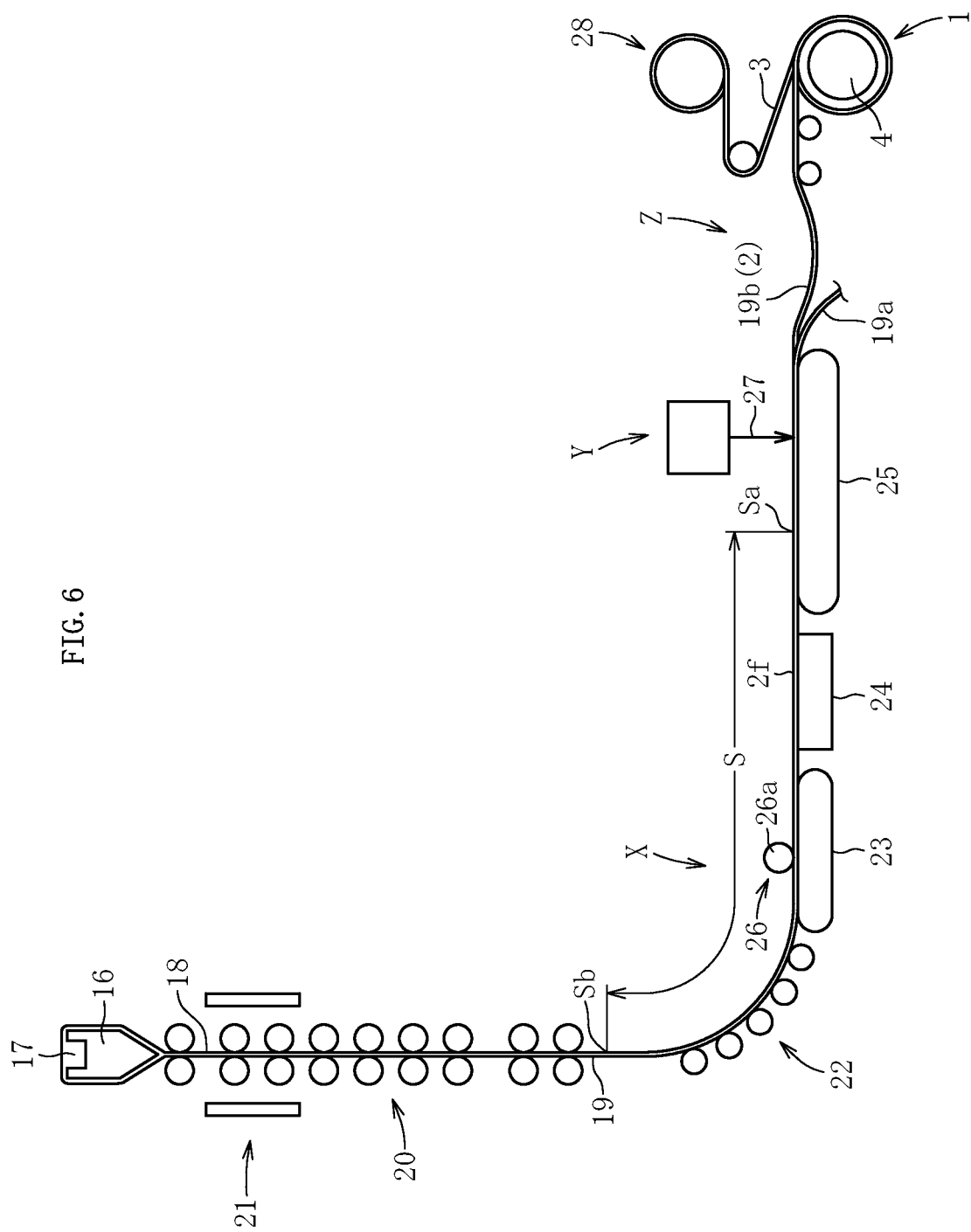
FIG. 6 is a side view for illustrating a glass roll manufacturing method according to an embodiment of the present invention.
Figure 7:
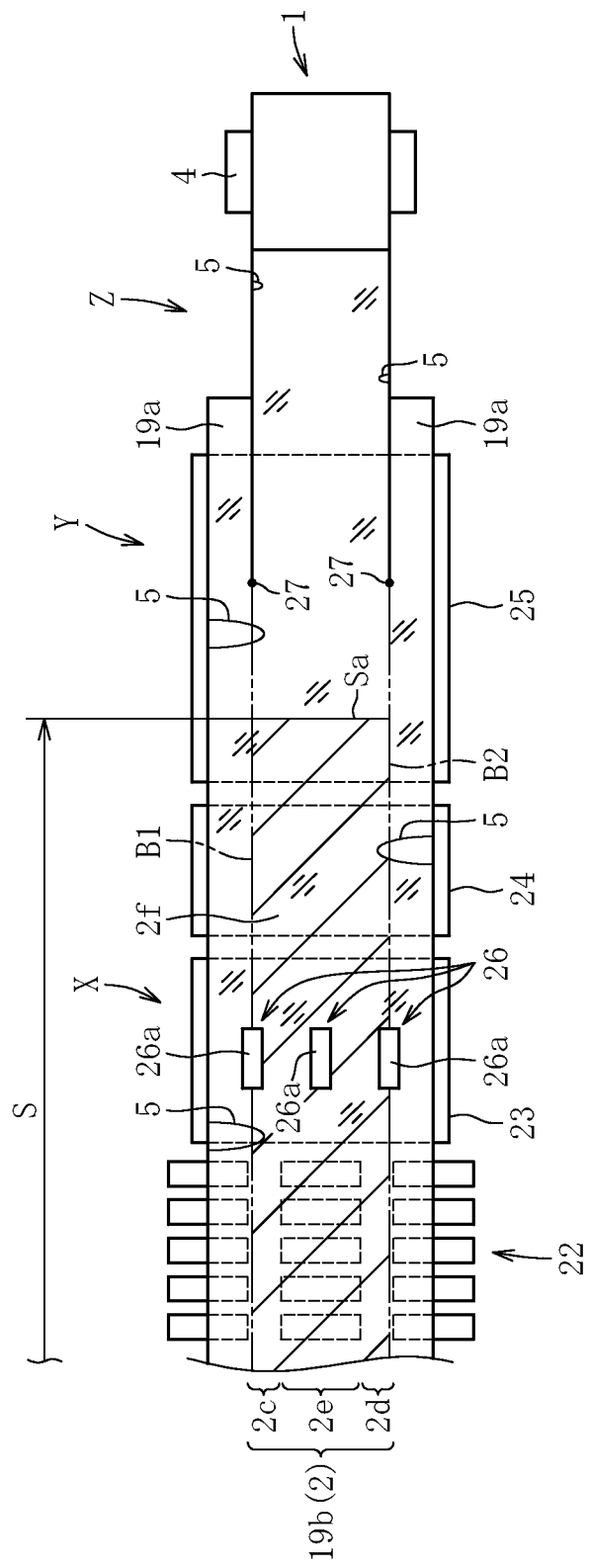
FIG. 7 is a plan view for illustrating the glass roll manufacturing method according to the embodiment of the present invention.
Figure 8:
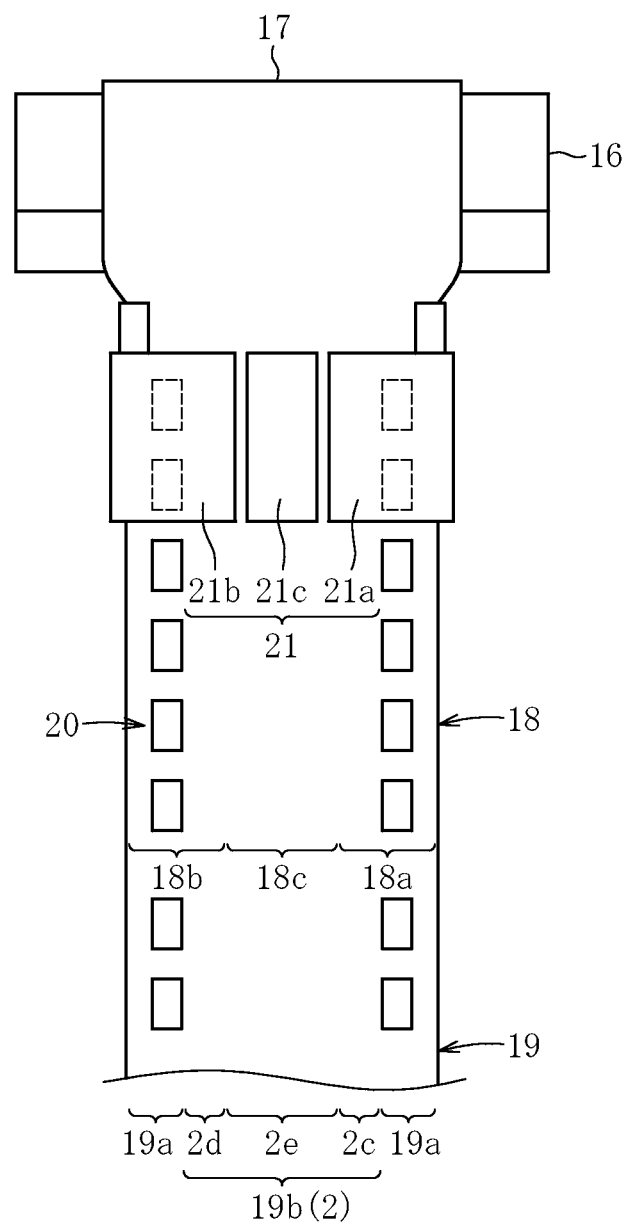
FIG. 8 is a front view for illustrating the glass roll manufacturing method according to the embodiment of the present invention.

As illustrated in FIG. 6 to FIG. 8, the manufacturing method of the present invention comprises: a forming step of cooling and solidifying a glass ribbon 18, which is obtained by forming molten glass 17 into a band shape with a forming trough 16, while pulling the glass ribbon 18 in a longitudinal direction, to thereby obtain a band-shaped glass film 19 having the creases 5 formed thereon; a dividing step of dividing both unnecessary portions 19a and 19a that are respectively present at both ends in a width direction of the band-shaped glass film 19 from an effective portion 19b positioned between both the unnecessary portions 19a and 19a; a winding step of winding up the divided band-shaped glass film 2 formed of the effective portion 19b into a roll shape, to thereby obtain the glass roll 1; and a measurement step of measuring, in a section S to be measured (section indicated by the hatched lines in FIG. 7) which is formed in the effective portion 19b, lengths from a leading end portion Sa to a trailing end portion Sb along the surface 2f, respectively, along the one side end portion 2c, the another side end portion 2d, and the center portion 2e positioned between both the end portions 2c and 2d in the width direction of the effective portion 19b.

Further, the manufacturing method of the present invention comprises performing a first adjusting step of adjusting to reduce, based on the result of the measurement step, a difference between speeds at which both one side end portion 18a and another side end portion 18b in the width direction of the glass ribbon 18 respectively connected to the one side end portion 2c and the another side end portion 2d of the effective portion 19b are cooled and solidified. In addition, the manufacturing method of the present invention comprises performing a second adjusting step of adjusting to reduce, based on the result of the measurement step, differences between speeds at which both the end portions 18a and 18b of the glass ribbon 18 are cooled and solidified and a speed at which a center portion 18c positioned between both the end portions 18a and 18b is cooled and solidified.

Here, the phrase "reduce a difference between speeds at which parts of the glass ribbon 18 are cooled and solidified" means reducing a distance (distance along a vertical direction in this embodiment) along a path between a point at which one part is cooled and solidified and a point at which another part is cooled and solidified on a path through which the glass ribbon 18 passes. Thus, when the difference between the speeds at which both the parts are cooled and solidified is zero, both the parts are cooled and solidified at the same point on the path through which the glass ribbon 18 passes.

When the forming step is performed, there are used, mainly, the forming trough 16 having a wedge shape for the overflow down-draw method, a roller group 20 formed of roller pairs arranged vertically in a plurality of stages, which are configured to pull down the glass ribbon 18 flowing down from the forming trough 16 while nipping the glass ribbon 18 from both front and back sides, and a heater group 21 formed of three heaters 21a, 21b, and 21c serving as heating units capable of respectively heating both the end portions 18a and 18b and the center portion 18c of the glass ribbon 18 that is flowing down. Of the three components 16, 20, and 21 to be used in the forming step, the configurations and operations of the forming trough 16 and the roller group 20 have already been known. Therefore, the detailed description thereof is omitted, and only the heater group 21 is described in detail.

The heater group 21 is arranged in an annealing furnace (not shown) configured to anneal the glass ribbon 18 to a temperature equal to or lower than a strain point, and the heaters 21a, 21b, and 21c forming the heater group 21 are arranged at the same point on a path through which the glass ribbon 18 flows down. That is, the heaters 21a, 21b, and 21c are located at the same height position. The heaters 21a, 21b, and 21c may each independently change the magnitude of heat energy applied to the glass ribbon 18. With this, the speeds at which the one side end portion 18a, the another side end portion 18b, and the center portion 18c of the glass ribbon 18 are cooled and solidified can be individually adjusted.

Here, in this embodiment, only one heater group 21 is arranged on the path through which the glass ribbon 18 flows down, but the present invention is not limited thereto. As a modification example of this embodiment, a plurality of heater groups 21 may be vertically arranged in a plurality of stages along the path through which the glass ribbon 18 flows down. In addition, as long as the difference between the speeds at which the parts of the glass ribbon 18 are cooled and solidified can be changed, it is not required to arrange the three heaters 21a, 21b, and 21c. For example, as a modification example of this embodiment, only the heater 21c among the three heaters may be arranged.

The one side end portion 18a of the glass ribbon 18 comprises a part that becomes the unnecessary portion 19a of the band-shaped glass film 19 after being cooled and solidified and a part that becomes the one side end portion 2c in the effective portion 19b of the band-shaped glass film 19 after being cooled and solidified. Similarly, the another side end portion 18b comprises a part that becomes the unnecessary portion 19a of the band-shaped glass film 19 after being cooled and solidified and a part that becomes the another side end portion 2d in the effective portion 19b of the band-shaped glass film 19 after being cooled and solidified. Further, the center portion 18c of the glass ribbon 18 becomes the center portion 2e of the effective portion 19b after being cooled and solidified.

The band-shaped glass film 19 obtained in the forming step is formed so as to have a thickness of, for example, 300 μm or less. The unnecessary portion 19a of the band-shaped glass film 19 comprises an edge portion having a thickness larger than those of the other parts. The mode by which the creases 5 are formed on the band-shaped glass film 19 is not limited to the description in this embodiment. Here, there is given a case as an example in which the creases 5 are formed in both the unnecessary portions 19a and 19a of the band-shaped glass film 19 and the one side end portion 2c and the another side end portion 2d of the effective portion 19b, and the creases 5 are not formed in the center portion 2e of the effective portion 19b.

Here, in this embodiment, the band-shaped glass film 19 is formed by the overflow down-draw method. However, as a modification example of this embodiment, the band-shaped glass film 19 may be formed by a slot down-draw method, a redraw method, or the like.

The conveyance direction of the band-shaped glass film 19 conveyed vertically downward after being formed is converted from a vertically downward direction to a horizontal direction by a roller group 22 formed of a plurality of rollers arranged along a curved conveyance track. Then, while the band-shaped glass film 19 is conveyed in the horizontal direction by a conveyor 23, a plate-shaped body 24, and a conveyor 25, the band-shaped glass film 19 is caused to sequentially pass through a measurement position X and a dividing position Y on the conveyance path.

Here, in this embodiment, in the conveyance path of the band-shaped glass film 19, the measurement position X is arranged in a section through which the band-shaped glass film 19 is conveyed in the horizontal direction, but the present invention is not limited thereto. As a modification example of this embodiment, the measurement position X may be arranged in the section through which the band-shaped glass film 19 is conveyed in the vertically downward direction.

In the measurement step performed at the measurement position X, a first measurement length (hereinafter referred to as "first measurement length LL1"), a second measurement length (hereinafter referred to as "second measurement length LL2"), and a third measurement length (hereinafter referred to as "third measurement length LL3") that are respectively measured along the one side end portion 2c, the another side end portion 2d, and the center portion 2e of the effective portion 19b are measured through use of three roller encoders 26 that each function as a measurement unit. The "center portion 2e" of the effective portion 19b means a part having a width of 200 mm positioned at the center in the width direction of the effective portion 19b. In addition, the "one side end portion 2c" and the "another side end portion 2d" of the effective portion 19b mean parts each positioned on an outer side in the width direction of the center portion 2e. Each of the measurement lengths LL1 To LL3 is measured at an arbitrary position within a width of each of the one side end portion 2c, the another side end portion 2d, and the center portion 2e.

The section S to be measured in which each of the measurement lengths LL1 to LL3 is to be measured is a section which is formed along a longitudinal direction of the effective portion 19b of the band-shaped glass film 19 and in which each of the leading end portion Sa and the trailing end portion Sb extends in parallel to the width direction. That is, the section S to be measured has a rectangular shape in plan view of the band-shaped glass film 19. The length of the section S to be measured (length along the longitudinal direction of the band-shaped glass film 19) may be set to an arbitrary length, and the length of the section S to be measured is set to preferably 20 m or more.

Each of the measurement lengths LL1 to LL3 is measured along the surface 2f of the section S to be measured. Therefore, the influence of the irregularities on the surface 2f caused by the creases 5 is reflected on the measurement results of the first measurement length LL1 and the second measurement length LL2, and the number quantity and size magnitude of the creases 5 are reflected as the magnitude of the measurement length on the measurement results. Meanwhile, the measurement result of the third measurement length LL3 is not influenced by the irregularities on the surface 2f caused by the creases 5.

Each of the roller encoders 26 used for performing the measurement step has the same configuration as that of the roller encoder 7 described in the <Measurement Mode of First Measurement Length to Third Measurement Length> section and can perform the same operation as that of the roller encoder 7. Therefore, the description thereof is omitted here. When rollers 26a serving as rotating bodies respectively provided to the roller encoders 26 finish rolling from the leading end portion Sa to the trailing end portion Sb along the surface 2f of the section S to be measured in the one side end portion 2c, the another side end portion 2d, and the center portion 2e of the effective portion 19b, measurement of each of the measurement lengths LL1 to LL3 is completed.

As a result of the measurement step, when a difference between both the first measurement length LL1 and the second measurement length LL2 (absolute value of LL1-LL2) is more than 400 ppm of a longer measurement length of both the measurement lengths LL1 and LL2, the first adjusting step is performed. The first adjusting step may be performed independently or performed together with the second adjusting step described later.

In this embodiment, description is given of an example in which the first measurement length LL1 is longer than the second measurement length LL2, and the difference between both the measurement lengths LL1 and LL2 is more than 400 ppm of the first measurement length LL1. In this case, in the one side end portion 2c of the effective portion 19b, the number of the creases 5 is excessively large, and the size of each of the creases 5 is excessively large as compared to those of the another side end portion 2d. Thus, the balance in number and size of the creases 5 present between both the end portions 2c and 2d deteriorates.

Here, as a result of extensive studies, the inventors of the present invention have found that the deterioration of the balance in number and size of the creases 5 present between the one side end portion 2c and the another side end portion 2d of the effective portion 19b is caused by an unsatisfactory balance between the difference in speed at which the center portion 18c and the one side end portion 18a of the glass ribbon 18 are cooled and solidified and the difference in speed at which the center portion 18c and the another side end portion 18b are cooled and solidified. In general, the speed at which the center portion 18c is cooled and solidified is higher than the speeds at which any of both the end portions 18a and 18b are cooled and solidified. In this embodiment, the difference between the speeds at which the center portion 18c and the one side end portion 18a are cooled and solidified is excessively larger than the difference between the speeds at which the center portion 18c and the another side end portion 18b are cooled and solidified.

In order to correct such state, the difference between the speeds at which both the end portions 18a and 18b of the glass ribbon 18 are cooled and solidified is adjusted to be reduced through use of the heaters 21a, 21b, and 21c. As a result, the balance between the difference in speed at which the center portion 18c and the one side end portion 18a of the glass ribbon 18 are cooled and solidified and the difference in speed at which the center portion 18c and the another side end portion 18b are cooled and solidified is improved. Preferably, the difference between the speeds at which both the end portions 18a and 18b are cooled and solidified is adjusted to be zero so that both the end portions 18a and 18b are cooled and solidified at the same point on the path through which the glass ribbon 18 flows down.

Specifically, any of the following operations (A) and (B) is performed. (A) Under a state in which the speed at which one of the one side end portion 18a and the another side end portion 18b is cooled and solidified is fixed, the speed at which another of the one side end portion 18a and the another side end portion 18b is cooled and solidified is brought close to the speed at which one of the one side end portion 18a and the another side end portion 18b is cooled and solidified. As a specific example, under a state in which the speed at which the another side end portion 18b is cooled and solidified is fixed, the speed at which the one side end portion 18a is cooled and solidified is increased. (B) While the speeds at which both the one side end portion 18a and the another side end portion 18b are cooled and solidified are changed, the speeds at which both the one side end portion 18a and the another side end portion 18b are cooled and solidified are brought close to each other. As a specific example, while the speeds at which both the one side end portion 18a and the another side end portion 18b are cooled and solidified are increased, the speeds at which both the one side end portion 18a and the another side end portion 18b are cooled and solidified are brought close to each other.

After the first adjusting step is performed, the measurement step is performed again through use of a section different from the above-mentioned section S to be measured as a new section S to be measured. The "new section S to be measured" is a section along the longitudinal direction of the effective portion 19b formed after the first adjusting step is performed.

As a result of the measurement step performed again, when the difference between both the measurement lengths LL1 and LL2 is equal to or less than 400 ppm of the first measurement length LL1, the above-mentioned balance is considered to have been improved, and the state of the operation of the heaters 21a, 21b, and 21c is maintained in the state after the first adjusting step.

Meanwhile, as a result of the measurement step performed again, when the difference between both the measurement lengths LL1 and LL2 is still more than 400 ppm of the first measurement length LL1, both the measurement step and the first adjusting step are alternately performed until the difference between both the measurement lengths LL1 and LL2 reaches 400 ppm or less of the first measurement length LL1 while the section S to be measured is changed to a new section every time the measurement step is performed.

Further, as a result of the measurement step, when at least one of two differences comprising a difference between the first measurement length LL1 and the third measurement length LL3 (absolute value of LL1-LL3) and a difference between the second measurement length LL2 and the third measurement length LL3 (absolute value of LL2-LL3) is more than 500 ppm of a longest measurement length of the first measurement length LL1 to the third measurement length LL3, the second adjusting step is performed. The second adjusting step may be performed independently or performed together with the first adjusting step.

In this embodiment, description is given of an example in which both the two differences comprising the difference between the first measurement length LL1 and the third measurement length LL3 and the difference between the second measurement length LL2 and the third measurement length LL3 are more than 500 ppm of the first measurement length LL1 that is longest among the first measurement length LL1 to the third measurement length LL3. In this case, the number and size of the creases 5 cannot be sufficiently suppressed in both the one side end portion 2c and the another side end portion 2d of the effective portion 19b.

Here, as a result of extensive studies, the inventors of the present invention have found that the insufficient suppression of the number and size of the creases 5 in the one side end portion 2c and the another side end portion 2d of the effective portion 19b is caused by a large difference between the speeds at which the center portion 18c and the one side end portion 18a of the glass ribbon 18 are cooled and solidified and between the speeds at which the center portion 18c and the another side end portion 18b of the glass ribbon 18 are cooled and solidified. In this embodiment, the speeds at which the one side end portion 18a and the another end portion 18b are cooled and solidified are excessively slower than that of the center portion 18c.

In order to correct such state, the differences between the speeds at which both the end portions 18a and 18b of the glass ribbon 18 are cooled and solidified and the speed at which the center portion 18c is cooled and solidified are adjusted in order to reduce the difference in speed through use of the heaters 21a, 21b, and 21c. Preferably, the differences between the speeds at which both the end portions 18a and 18b are cooled and solidified and the speed at which the center portion 18c is cooled and solidified are adjusted to be zero so that both the end portions 18a and 18b and the center portion 18c are cooled and solidified at the same point on the path through which the glass ribbon 18 flows down.

Specifically, any of the following operations (C) and (D) is performed. (C) Under a state in which one of the speeds at which both the end portions 18a and 18b are cooled and solidified and the speed at which the center portion 18c is cooled and solidified is fixed, another of the speeds at which both the end portions 18a and 18b are cooled and solidified and the speed at which the center portion 18c is cooled and solidified is brought close to one of the speeds at which both the end portions 18a and 18b are cooled and solidified and the speed at which the center portion 18c is cooled and solidified. As a specific example, under a state in which the speed at which the center portion 18c is cooled and solidified is fixed, the speeds at which both the end portions 18a and 18b are cooled and solidified are increased. Further, as another specific example, under a state in which the speeds at which both the end portions 18a and 18b are cooled and solidified are fixed, the speed at which the center portion 18c is cooled and solidified is decreased. (D) Both the speeds at which both the end portions 18a and 18b are cooled and solidified and the speed at which the center portion 18c is cooled and solidified are changed to bring both the speeds close to each other. As a specific example, the speeds at which both the end portions 18a and 18b are cooled and solidified are increased, and the speed at which the center portion 18c is cooled and solidified is decreased, to thereby bring both the speeds close to each other.

After the second adjusting step is performed, the measurement step is performed again through use of a section different from the above-mentioned section S to be measured as a new section S to be measured. The "new section S to be measured" is a section along the longitudinal direction of the effective portion 19b formed after the second adjusting step is performed.

As a result of the measurement step performed again, when both the difference between the first measurement length LL1 and the third measurement length LL3 and the difference between the second measurement length LL2 and the third measurement length LL3 are 500 ppm or less of the first measurement length LL1 that is longest, the number and size of the creases 5 are considered to have been sufficiently suppressed in both the one side end portion 2c and the another side end portion 2d. Then, the state of the operation of the heaters 21a, 21b, and 21c is maintained in the state after the second adjusting step.

Meanwhile, as a result of the measurement step performed again, when the difference between both the measurement lengths LL1 and LL2 is more than 500 ppm of a longest measurement length of the first measurement length LL1, both the measurement step and the second adjusting step are alternately performed until the difference between both the measurement lengths LL1 and LL2 reaches 500 ppm or less of a longest measurement length of the first measurement length LL1 while the section S to be measured is changed to a new section every time the measurement step is performed.

In the measurement step performed once or a plurality of times, there is a fear in that the surface 2f of a section serving as the section S to be measured in the effective portion 19b may have been contaminated through contact with the roller 26a provided to the roller encoder 26, and hence the section serving as the section S to be measured is divided from a section of the effective portion 19b to be wound and discarded. Further, in the effective section 19b, a section that is formed before the difference between both the measurement lengths LL1 and LL2 reaches 400 ppm or less of the longer measurement length (in this case, the first measurement length LL1) is also divided from the section of the effective portion 19b to be wound and discarded as a defective section. The detail is described later.

The band-shaped glass film 19 having reached the dividing position Y after passing through the measurement position X is subjected to the dividing step, and cutting is performed along boundary lines B1 and B2 between the effective portion 19b and both the unnecessary portions 19a and 19a through use of a laser 27. With this, both the unnecessary portions 19a and 19a are divided from the effective portion 19b. Cutting through use of the laser 27 may be performed, for example, by a laser cleaving method that has been already known. Both the unnecessary portions 19a and 19a after being divided are dropped down from the conveyor 25 and discarded.

The effective portion 19b (the band-shaped glass film 2 after being divided), which have been divided from both the unnecessary portions 19a and 19a and have passed through the dividing position Y, is caused to pass through a slack conveyance position Z at which the effective portion 19b is conveyed under a state of being slack downward to reach the winding core 4. The section serving as the section S to be measured and the effective portion 19b excluding the section determined to be the defective section are caused to pass through the slack conveyance position Z to reach the winding core 4. The section determined to be the defective section and the section serving as the section S to be measured are divided from the section to be wound without reaching the winding core 4, and dropped downward at the slack conveyance position Z to be discarded.

As described above, when the effective portion 19b formed of a section other than the section to be discarded is wound up around the winding core 4 to complete winding of a desired length, the glass roll 1 is completed. When the effective portion 19b is wound up around the winding core 4, the effective portion 19b is wound up under a state of being superposed on the band-shaped protective sheet 3 supplied from a third sheet roll 28.

Here, in this embodiment, the difference between the speeds at which both the one side end portion 18a and the another side end portion 18b of the glass ribbon 18 are cooled and solidified is adjusted in order to reduce the difference in speed in the first adjusting step, but the present invention is not limited thereto. The first adjusting step may be performed in a mode different from that of this embodiment as long as the difference between both the measurement lengths LL1 and LL2 is adjusted to be reduced.

In addition, in this embodiment, the differences between the speeds at which both the end portions 18a and 18b of the glass ribbon 18 are cooled and solidified and the speed at which the center portion 18c positioned between both the end portions 18a and 18b is cooled and solidified are adjusted in order to reduce the difference in speed in the second adjusting step, but the present invention is not limited thereto. The second adjusting step may be performed in a mode different from that of this embodiment as long as, of the two differences comprising (absolute value of LL1-LL3) and (absolute value of LL2-LL3), the difference that is more than 500 ppm of the longest measurement length of LL1 to LL3 is adjusted to be reduced.

<Glass Roll Quality Evaluation Method>

Now, a method of evaluating quality of the glass roll 1 is described. In the description of the evaluation method of the present invention, the same elements as those described in the <Glass Roll> section, the <Measurement Mode of First Measurement Length to Third Measurement Length> section, and the <Glass Roll Manufacturing Method> section are denoted by the same reference symbols as those in the description therein, and overlapping description is omitted.

Figure 9:
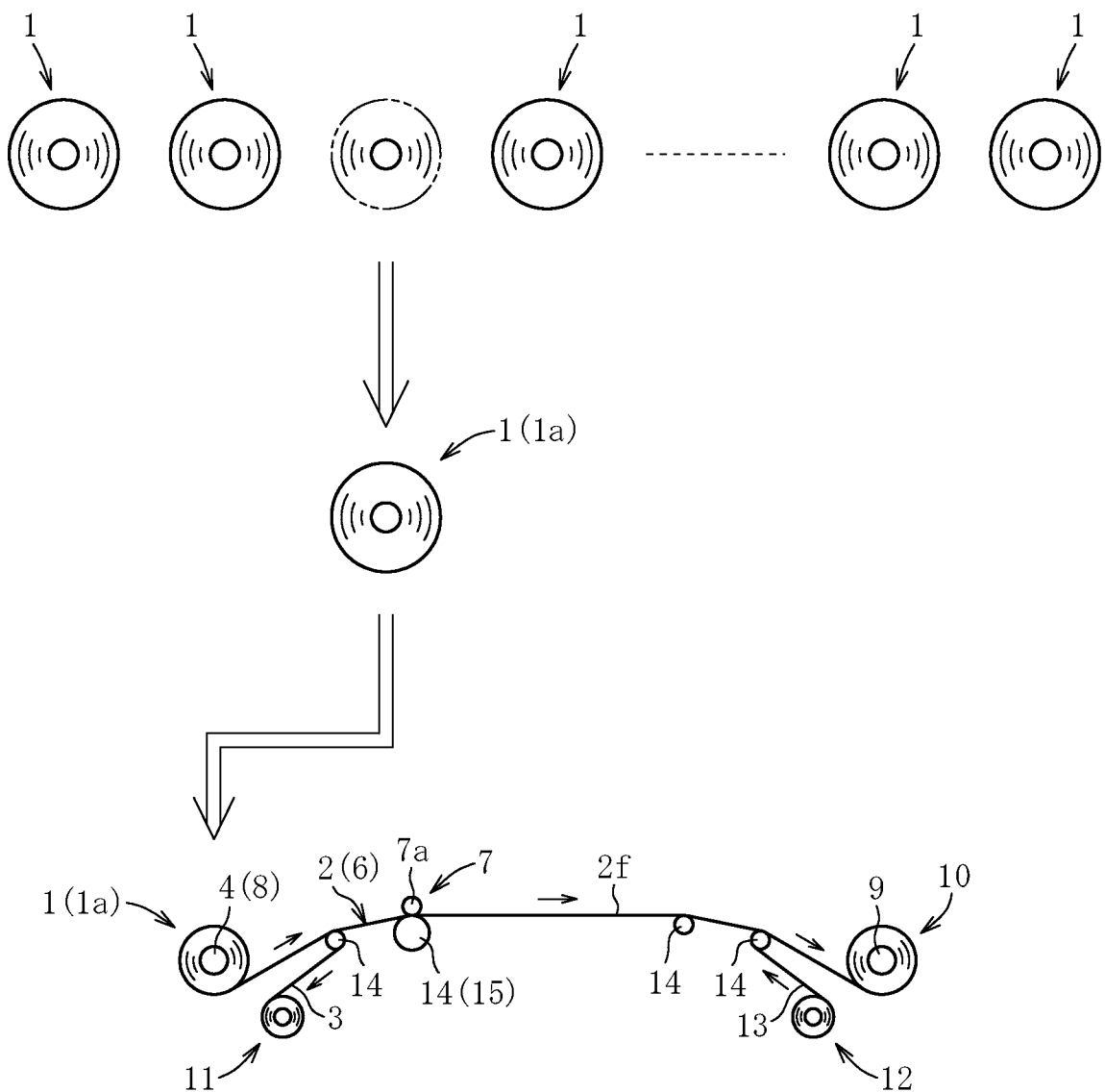
FIG. 9 is a view for illustrating a glass roll quality evaluation method according to an embodiment of the present invention.
Figure 10A:
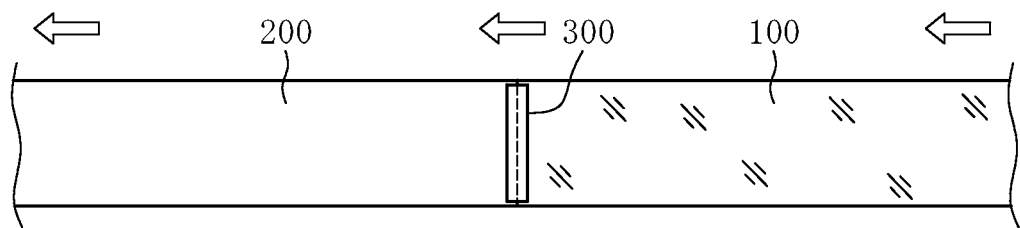
FIG. 10a is an explanatory plan view for illustrating a problem in a related-art glass roll.
Figure 10B:
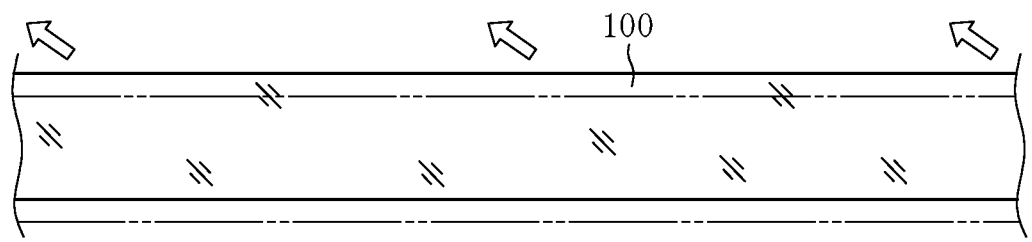
FIG. 10b is an explanatory plan view for illustrating the problem in the related-art glass roll.
Figure 11A:
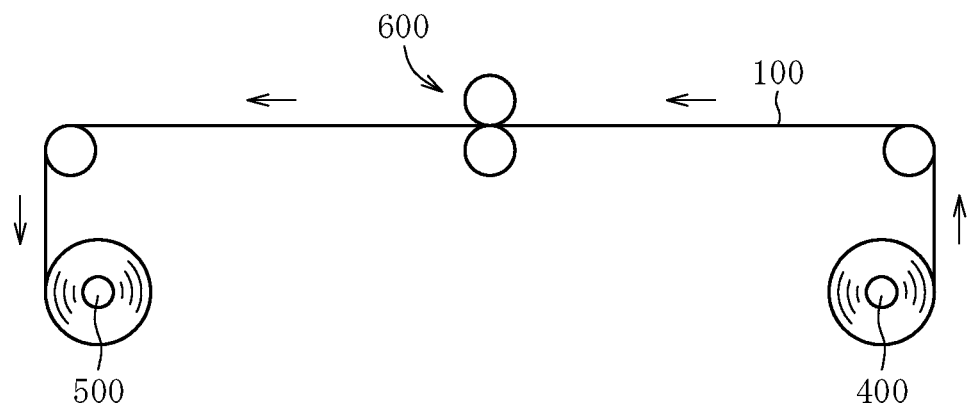
FIG. 11a is an explanatory side view for illustrating a problem in the related-art glass roll.
Figure 11B:
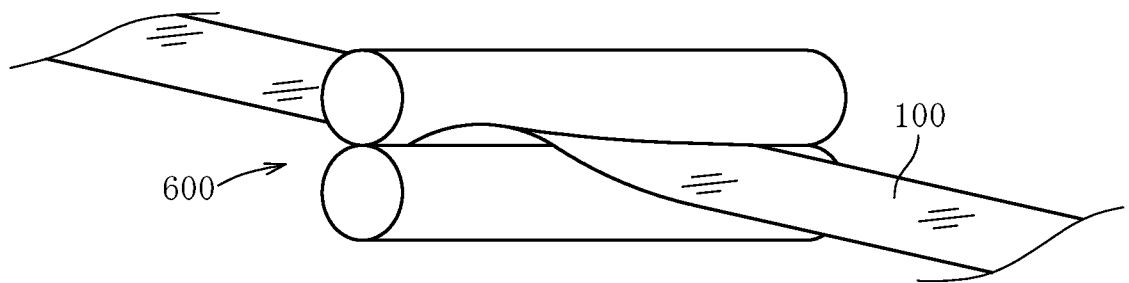
FIG. 11b is an explanatory perspective view for illustrating the problem in the related-art glass roll.

A flow of the evaluation method of the present invention is illustrated in FIG. 9. In the evaluation method of the present invention, first, a sampling step of extracting a sample glass roll 1a from the plurality of glass rolls 1 manufactured under the same condition is performed. The plurality of glass rolls 1 are manufactured under the same forming condition (the state of the operation of the heaters 21a, 21b, and 21c is also the same), the same dividing condition, and the same winding condition, for example, by the <Glass Roll Manufacturing Method>.

Here, in this embodiment, only one glass roll 1 is extracted as the sample glass roll 1a, but the present invention is not limited thereto. As a modification example of this embodiment, two or more glass rolls 1 may be extracted. With this, the accuracy of determination in a determination step described later can be enhanced in proportion to an increase in number of the samples. In addition, as one example, the frequency of extraction when only one sample glass roll 1a is extracted is preferably one for every three days, more preferably one for every two days, still more preferably one for every day of manufacturing of the glass rolls.

The sample glass roll 1a extracted in the sampling step is subjected to a measuring step. In the measuring step, in the band-shaped glass film 2 having the creases 5 formed thereon, which forms the sample glass roll 1a, the lengths from the leading end portion 2a to the trailing end portion 2b along the surface 2f of the effective section 6 are measured through use of the roll-to-roll mode. Specifically, the above-mentioned lengths are respectively measured along the one side end portion 2c, the another side end portion 2d, and the center portion 2e positioned between both the end portions 2c and 2d in the width direction of the effective section 6, and the measurement results are respectively defined as one side measurement length (hereinafter referred to as "one side measurement length ML1"), another side measurement length (hereinafter referred to as "another side measurement length ML2"), and center measurement length (hereinafter referred to as "center measurement length ML3").

Here, the "center portion 2e" of the effective section 6 means a part having a width of 200 mm positioned at the center in the width direction of the effective section 6. In addition, the "one side end portion 2c" and the "another side end portion 2d" of the effective section 6 mean parts each positioned on an outer side in the width direction of the center portion 2e.

The specific mode for measuring the one side measurement length ML1, the another side measurement length ML2, and the center measurement length ML3 is substantially the same as that (FIG. 3 to FIG. 5c) for measuring the first measurement length L1, the second measurement length L2, and the third measurement length L3, and hence only differences from the measurement mode of the first measurement length L1 to the third measurement length L3 are described.

The first measurement length L1, the second measurement length L2, and the third measurement length L3 are respectively measured along the first position P1, the second position P2, and the widthwise center line CL. Meanwhile, the one side measurement length ML1, the another side measurement length ML2, and the center measurement length ML3 are lengths that are respectively measured along an arbitrary position within a width of the one side end portion 2c, an arbitrary position within a width of the another side end portion 2d, and an arbitrary position within a width of the center portion 2e. That is, these three arbitrary positions may be or may not be matched with the first position P1, the second position P2, and the widthwise center line CL, respectively.

When the measuring step is completed, the determination step of determining validity of quality of the plurality of glass rolls 1 excluding the sample glass roll 1a is performed based on the difference between both the one side measurement length ML1 and the another side measurement length ML2.

Here, the sample glass roll 1a and each of the plurality of glass rolls 1 excluding the sample glass roll 1a are manufactured under the same condition and can be considered to be substantially the same glass rolls 1. Therefore, when the occurrence of skew and single slack in the band-shaped glass film 2 can be prevented in the sample glass roll 1a when the roll-to-roll mode is used, the same effect is considered to be attained also in each of the plurality of glass rolls 1. In addition, when processing can be preferably performed on the band-shaped glass film in the sample glass roll 1a when the roll-to-roll mode is used, the same effect is considered to be attained also in each of the plurality of glass rolls 1.

In the determination step, when a difference between both the measurement lengths ML1 and ML2 (absolute value of ML1-ML2) is 400 ppm or less (preferably 200 ppm or less, more preferably 100 ppm or less) of a longer measurement length of both the measurement lengths ML1 and ML2, it is determined that the quality of the plurality of glass rolls 1 excluding the sample glass roll 1a is accepted. Specifically, the plurality of glass rolls 1 excluding the sample glass roll 1a are determined to be the glass rolls 1 in which the occurrence of skew and single slack in the band-shaped glass film 2 can be prevented when the roll-to-roll mode is used.

In addition, when, of a difference between the one side measurement length ML1 and the center measurement length ML3 (absolute value of ML1-ML3) and a difference between the another side measurement length ML2 and the center measurement length ML3 (absolute value of ML2-ML3), a larger difference is 500 ppm or less (preferably 300 ppm or less, more preferably 200 ppm or less) of a longest measurement length of the three measurement lengths ML1, ML2, and ML3, it is determined that the quality of the plurality of glass rolls 1 excluding the sample glass roll 1a is accepted as being excellent. Specifically, the plurality of glass rolls 1 excluding the sample glass roll 1a are determined to be the glass rolls 1 in which the occurrence of skew and single slack in the band-shaped glass film 2 can be prevented when the roll-to-roll mode is used and in which processing can be preferably performed on the band-shaped glass film 2.

EXAMPLES

In order to examine the presence or absence of the effects of the present invention, each of eight kinds of glass rolls (Examples: six kinds, Comparative Examples: two kinds) shown in the following [Table 1] and eight kinds of glass rolls (Examples: five kinds, Comparative Examples: three kinds) shown in [Table 2] was inspected for whether or not the occurrence of skew and single slack in the band-shaped glass film can be prevented when the roll-to-roll mode is used. In each of the glass rolls shown in [Table 1], the band-shaped glass film having a thickness of 100 μm is wound into a roll shape. In each of the glass rolls shown in [Table 2], the band-shaped glass film having a thickness of 50 μm is wound into a roll shape.

In this inspection, when the roll-to-roll mode was used, the band-shaped glass film was pulled and conveyed by a leader having the same width dimension as that of the band-shaped glass film. With this, when no skew occurs in the band-shaped glass film, end portions in a width direction of the subsequent band-shaped glass film pass through, without deviation, a passage line through which end portions in a width direction of the preceding leader have passed.

In addition, in this inspection, nip rollers (not shown) formed of a pair of rollers configured to nip the band-shaped glass film in the thickness direction were arranged on a conveyance path. With this, when skew occurs beyond an allowable range in the band-shaped glass film, single slack of the band-shaped glass film deteriorates on an immediate upstream side of the nip rollers, and there is an increased risk in that the band-shaped glass film may be broken.

"Calculation result 1" in items of the calculation result in [Table 1] and [Table 2] indicates a ratio between the difference between the first measurement length L1 and the second measurement length L2 (absolute value of L1-L2) and the longer measurement length of both the measurement lengths L1 and L2. When the value of the measurement result 1 is decreased, the balance in number and size of the creases is satisfactory between the one side end portion and the another side end portion in the width direction of the band-shaped glass film.

"Calculation result 2" in items of the calculation result in [Table 1] and [Table 2] indicates a ratio between the difference between the first measurement length L1 and the third measurement length L3 (absolute value of L1-L3) and the longest measurement length of all the measurement lengths L1, L2, and L3. In addition, "Calculation result 3" indicates a ratio between the difference between the second measurement length L2 and the third measurement length L3 (absolute value of L2-L3) and the longest measurement length of the first to third measurement lengths L1, L2, and L3. When a relatively larger value of the calculation result 2 and the calculation result 3 is decreased, the number and size of the creases present in each of the one side end portion and the another side end portion in the width direction of the band-shaped glass film are suppressed.

"Skew amount" in items of the roll-to-roll result in [Table 1] and [Table 2] is a value measured as described below. Specifically, the "Skew amount" is a value measured by determining how much a passage line through which the end portions in the width direction of the subsequent band-shaped glass film have passed deviates at a maximum in the width direction from a passage line through which the end portions in the width direction of the preceding leader have passed at a fixed point on the conveyance path of the band-shaped glass film.

The results of the inspection are shown in [Table 1] and [Table 2]. Each value shown in [Table 1] and [Table 2] is a value per 30,000 mm (per 30 m) of the third measurement length L3.

TABLE 1

| | Band-shaped glass film | | Measurement result | | | Calculation result | | | Roll-to-roll result | | |
|---|---|---|---|---|---|---|---|---|---|---|---|
| | | | First measurement length | Second measurement length | Third measurement length | | | | | | |
| | Thickness μm | Width mm | L1 mm | L2 mm | L3 mm | Calculation result 1 ppm | Calculation result 2 ppm | Calculation result 3 ppm | Skew amount mm | Single slack | Breakage |
| Example 1 | 100 | 500 | 30,004.5 | 30,004.8 | 30,000 | 10 | 150 | 160 | 2 | None | None |
| Example 2 | 100 | 500 | 30,006 | 30,005.7 | 30,000 | 10 | 200 | 190 | 2 | None | None |
| Example 3 | 100 | 500 | 30,006.6 | 30,006 | 30,000 | 20 | 220 | 200 | 2 | None | None |
| Example 4 | 100 | 500 | 30,008.1 | 30,006 | 30,000 | 70 | 270 | 200 | 4 | None | None |
| Example 5 | 100 | 500 | 30,003.9 | 30,007.2 | 30,000 | 110 | 130 | 240 | 15 | None | None |
| Example 6 | 100 | 500 | 30,004.2 | 30,010.5 | 30,000 | 210 | 140 | 350 | 17 | Occurrence | None |
| Comparative Example 1 | 100 | 500 | 30,018.6 | 30,006.3 | 30,000 | 410 | 620 | 210 | 33 | Occurrence | Occurrence |
| Comparative Example 2 | 100 | 500 | 30,023.1 | 30,009.3 | 30,000 | 460 | 770 | 310 | 39 | Occurrence | Occurrence |

TABLE 2

| | Band-shaped glass film | | Measurement result | | | Calculation result | | | Roll-to-roll result | | |
|---|---|---|---|---|---|---|---|---|---|---|---|
| | | | First measurement length | Second measurement length | Third measurement length | | | | | | |
| | Thickness μm | Width mm | L1 mm | L2 mm | L3 mm | Calculation result 1 ppm | Calculation result 2 ppm | Calculation result 3 ppm | Skew amount mm | Single slack | Breakage |
| Example 7 | 50 | 800 | 30,010.5 | 30,008.4 | 30,000 | 70 | 350 | 280 | 3 | Occurrence | None |
| Example 8 | 50 | 800 | 30,005.1 | 30,001.5 | 30,000 | 120 | 170 | 50 | 15 | None | None |

TABLE 2-continued

| Band-shaped glass film | | Measurement result | | | Calculation result | | | Roll-to-roll result | | |
|---|---|---|---|---|---|---|---|---|---|---|
| | | First measurement length | Second measurement length | Third measurement length | Calculation result 1 | Calculation result 2 | Calculation result 3 | Skew amount | Single slack | Breakage |
| Thickness μm | Width mm | L1 mm | L2 mm | L3 mm | ppm | ppm | ppm | mm | | |
| Example 9 | 50 | 800 | 30,005.4 | 30,001.2 | 30,000 | 140 | 180 | 40 | 11 | None | None |
| Example 10 | 50 | 800 | 30,013.8 | 30,008.1 | 30,000 | 190 | 460 | 270 | 18 | Occurrence | None |
| Example 11 | 50 | 800 | 30,009 | 30,003 | 30,000 | 200 | 300 | 100 | 14 | Occurrence | None |
| Comparative Example 3 | 50 | 800 | 30,030.9 | 30,013.5 | 30,000 | 580 | 1,030 | 450 | 45 | Occurrence | Occurrence |
| Comparative Example 4 | 50 | 800 | 30,027.3 | 30,012 | 30,000 | 510 | 910 | 400 | 44 | Occurrence | Occurrence |
| Comparative Example 5 | 50 | 800 | 30,026.4 | 30,012 | 30,000 | 480 | 880 | 400 | 39 | Occurrence | Occurrence |

As is apparent from the results shown in [Table 1] and [Table 2], it is understood that, in each of Examples in which the value of the calculation result 1 was 400 ppm or less, breakage of the band-shaped glass film did not occur unlike each of Comparative Examples. It is assumed that such a result was obtained because of the following reason. In each of Examples, the skew amount was significantly suppressed as compared to that of each of Comparative Examples, and the occurrence of single slack was able to be substantially eliminated. In Example 6 in [Table 1], and Examples 7, 10, and 11 in [Table 2], single slack slightly occurred, but the single slack was able to be prevented from deteriorating to such a degree as to break the band-shaped glass film. It is presumed from the foregoing that, according to the glass roll of the present invention, the occurrence of skew and single slack in the band-shaped glass film can be suppressed when the roll-to-roll mode is used, with the result that the breakage of the band-shaped glass film can be avoided.

REFERENCE SIGNS LIST 1 glass roll
1a sample glass roll
2 band-shaped glass film
2c one side end portion
2d another side end portion
2e center portion
2f surface
2g one side edge
2h another side edge
5 crease
6 effective section
6a leading end portion
6b trailing end portion
7 roller encoder
7a roller
16 forming trough
17 molten glass
18 glass ribbon
18a one side end portion
18b another side end portion
18c center portion
19 band-shaped glass film
19a unnecessary portion
19b effective portion
21 heater group
21a to 21c heater
26 roller encoder
26a roller
CL widthwise center line
L1 first measurement length
L2 second measurement length
L3 third measurement length
P1 first position
P2 second position
S section to be measured
Sa leading end portion
Sb trailing end portion

The invention claimed is:

1. A glass roll comprising a band-shaped glass film, which is wound into a roll shape, and has creases formed thereon, wherein the band-shaped glass film comprises an effective section in which one side edge and another side edge in a width direction extend in parallel to each other, and in which each of a leading end portion and a trailing end portion extends in parallel to the width direction of the band-shaped glass film,
wherein a difference between a first length and a second length is 400 ppm or less of a longer length of the first length and the second length, the first length being a length from the leading end portion to the trailing end portion along a surface of the effective section and along a first position along the one side edge of the band-shaped glass film and the second length being a length from the leading end portion to the trailing end portion along the surface of the effective section and along a second position along the another side edge of the band-shaped glass film,
wherein the first length and the second length are lengths when the effective section is formed to be its longest in the band-shaped glass film, and
wherein the creases form an unevenness of a surface of the band-shaped glass film without cracks and are not eliminated with an application of tension to the band-shaped glass film.

2. The glass roll according to claim 1, wherein the difference between the first length and the second length is 200 ppm or less of the longer length of the first length and the second length.

3. The glass roll according to claim 2, wherein the difference between the first length and the second length is 100 ppm or less of the longer length of the first length and the second length.

4. The glass roll according to claim 1, wherein
a length from the leading end portion to the trailing end portion along the surface of the effective section and along a widthwise center line free from having the creases on the band-shaped glass film is a third length in addition to the first length and the second length, and
a larger difference of a difference between the first length and the third length and a difference between the second length and the third length is 500 ppm or less of a longest length of the first length, the second length, and the third length.

5. The glass roll according to claim 4, wherein the larger difference is 300 ppm or less of the longest length of the first length, the second length, and the third length.

6. The glass roll according to claim 5, wherein the larger difference is 200 ppm or less of the longest length of the first length, the second length, and the third length.

7. A glass roll manufacturing method comprising:
a forming step of cooling and solidifying a glass ribbon, which is obtained by forming molten glass into a band shape with a forming trough, while pulling the glass ribbon in a longitudinal direction, to thereby obtain a band-shaped glass film having creases formed thereon, the creases forming an unevenness of a surface of the band-shaped glass film without cracks, and the creases not being eliminated with an application of tension to the band-shaped glass film;
a dividing step of dividing unnecessary portions that are respectively present at both ends in a width direction of the band-shaped glass film from an effective portion positioned between both the unnecessary portions;
a winding step of winding up the effective portion of the band-shaped glass film into a roll shape, to thereby obtain a glass roll; and
a measurement step of measuring a length of a section of the effective portion from a leading end portion of the section to a trailing end portion of the section along a surface of the section at each of one side end portion and another side end portion in a width direction of the effective portion, the leading end portion and the trailing end portion of the section extending parallel to the width direction of the band-shaped glass film,
wherein, when a difference between a first measurement length and a second measurement length which are respectively measured along the one side end portion and the another side end portion is more than 400 ppm of a longer measurement length of the first measurement length and the second measurement length, a first adjusting step of adjusting to reduce the difference between the first measurement length and the second measurement length is performed.

8. The glass roll manufacturing method according to claim 7, wherein the first adjusting step comprises a step of adjusting to reduce a difference between speeds at which both one side end portion and another side end portion in a width direction of the glass ribbon respectively connected to the one side end portion and the another side end portion of the effective portion are cooled and solidified.

9. The glass roll manufacturing method according to claim 8, wherein, when the difference between the first measurement length and the second measurement length is more than 400 ppm of the longer measurement length, both the measurement step and the first adjusting step are alternately performed until the difference between the first measurement length and the second measurement length reaches 400 ppm or less of the longer measurement length while the section is changed to a new section every time the measurement step is performed.

10. The glass roll manufacturing method according to claim 8,
wherein the measurement step comprises measuring a length of the section from the leading end portion to the trailing end portion along the surface of the section as a third measurement length along a center portion of the effective portion free from the creases in addition to the first measurement length and the second measurement length, the center portion being positioned between the one side end portion and the another side end portion of the effective portion, and
wherein, when at least one of two differences comprising a difference between the first measurement length and the third measurement length and a difference between the second measurement length and the third measurement length is more than 500 ppm of a longest measurement length of the first measurement length, the second measurement length, and the third measurement length, a second adjusting step of adjusting to reduce the difference that is more than 500 ppm of the longest measurement length out of the two differences is performed.

11. The glass roll manufacturing method according to claim 10, wherein the second adjusting step is a step of adjusting to reduce a difference between speeds at which one side end portion and another side end portion of the glass ribbon are cooled and solidified and a speed at which a center portion positioned between both the one side end portion and the another side end portion is cooled and solidified.

12. The glass roll manufacturing method according to claim 10, wherein, when at least one of the two differences is more than 500 ppm of the longest measurement length, both the measurement step and the second adjusting step are alternately performed until both the two differences reach 500 ppm or less of the longest measurement length while the section is changed to a new section every time the measurement step is performed.

13. The glass roll manufacturing method according to claim 8,
wherein a measurement unit is used for measuring each of the first and second measurement lengths, and
wherein the measurement unit comprises a rotating body which is movable in a thickness direction of the section in response to irregularities on the surface of the section caused by the creases while rotating through friction with the surface of the section under a state of being held in contact with the surface of the section, and is configured to measure each of the first and second measurement lengths based on a distance by which the rotating body rolls on the surface of the section.

14. The glass roll manufacturing method according to claim 13, wherein the section is divided from the effective portion and discarded.

15. The glass roll manufacturing method according to claim 8, further comprising adjusting a speed at which each part is cooled and solidified through use of three heating units that are respectively configured to heat the one side end portion, the another side end portion, and the center portion positioned between the one side end portion and the another side end portion of the glass ribbon.

16. The glass roll manufacturing method according to claim 7, wherein, in the measurement step, the measuring of the length of the section of the effective portion from the leading end portion of the section to the trailing end portion of the section is in a direction of conveyance of the effective portion.

\* \* \* \* \*